(12) United States Patent
Matsushima

(10) Patent No.: US 9,733,528 B2
(45) Date of Patent: Aug. 15, 2017

(54) DISPLAY DEVICE

(71) Applicant: Japan Display Inc., Minato-ku (JP)

(72) Inventor: Toshiharu Matsushima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/817,811

(22) Filed: Aug. 4, 2015

(65) Prior Publication Data

US 2016/0062191 A1    Mar. 3, 2016

(30) Foreign Application Priority Data

Aug. 27, 2014   (JP) .................................. 2014-172374

(51) Int. Cl.
  *G02F 1/1343*   (2006.01)
  *G02F 1/1337*   (2006.01)

(52) U.S. Cl.
  CPC ...... *G02F 1/134309* (2013.01); *G02F 1/1337* (2013.01); *G02F 2001/133738* (2013.01); *G02F 2001/134372* (2013.01)

(58) Field of Classification Search
  CPC .......................................... G02F 2001/134372
  See application file for complete search history.

(56) References Cited

U.S. PATENT DOCUMENTS

| 2007/0242205 A1* | 10/2007 | Shimura | ........... G02F 1/134363 349/141 |
| 2013/0100388 A1 | 4/2013 | Matsushima | |
| 2014/0092353 A1 | 4/2014 | Matsushima | |
| 2014/0118639 A1 | 5/2014 | Matsushima | |
| 2014/0293175 A1 | 10/2014 | Tamaki et al. | |
| 2014/0293176 A1 | 10/2014 | Tamaki et al. | |
| 2014/0293177 A1 | 10/2014 | Matsushima | |
| 2014/0307212 A1 | 10/2014 | Oka et al. | |
| 2014/0320791 A1 | 10/2014 | Oiwa et al. | |
| 2014/0354931 A1 | 12/2014 | Kurasawa et al. | |

FOREIGN PATENT DOCUMENTS

JP    2014-071309    4/2014

OTHER PUBLICATIONS

U.S. Appl. No. 14/817,382, filed Aug. 4, 2015, Matsushima.

* cited by examiner

*Primary Examiner* — Phu Vu
(74) *Attorney, Agent, or Firm* — Oblon, McClelland, Maier & Neustadt, L.L.P.

(57) ABSTRACT

According to one embodiment, a display device includes a first substrate with a first alignment film, a second substrate with a second alignment film, and a liquid crystal layer interposed therebetween. The first substrate has first and second electrodes. An initial alignment direction of liquid crystal molecules of the liquid crystal layer is parallel to a first direction or a direction orthogonal to the first direction. The second electrode includes comblike electrodes extending parallel to the first direction and a connecting portion which connects the comblike electrodes. The connecting portion includes a projection which projects in a second direction more than an outermost comblike electrode.

2 Claims, 20 Drawing Sheets

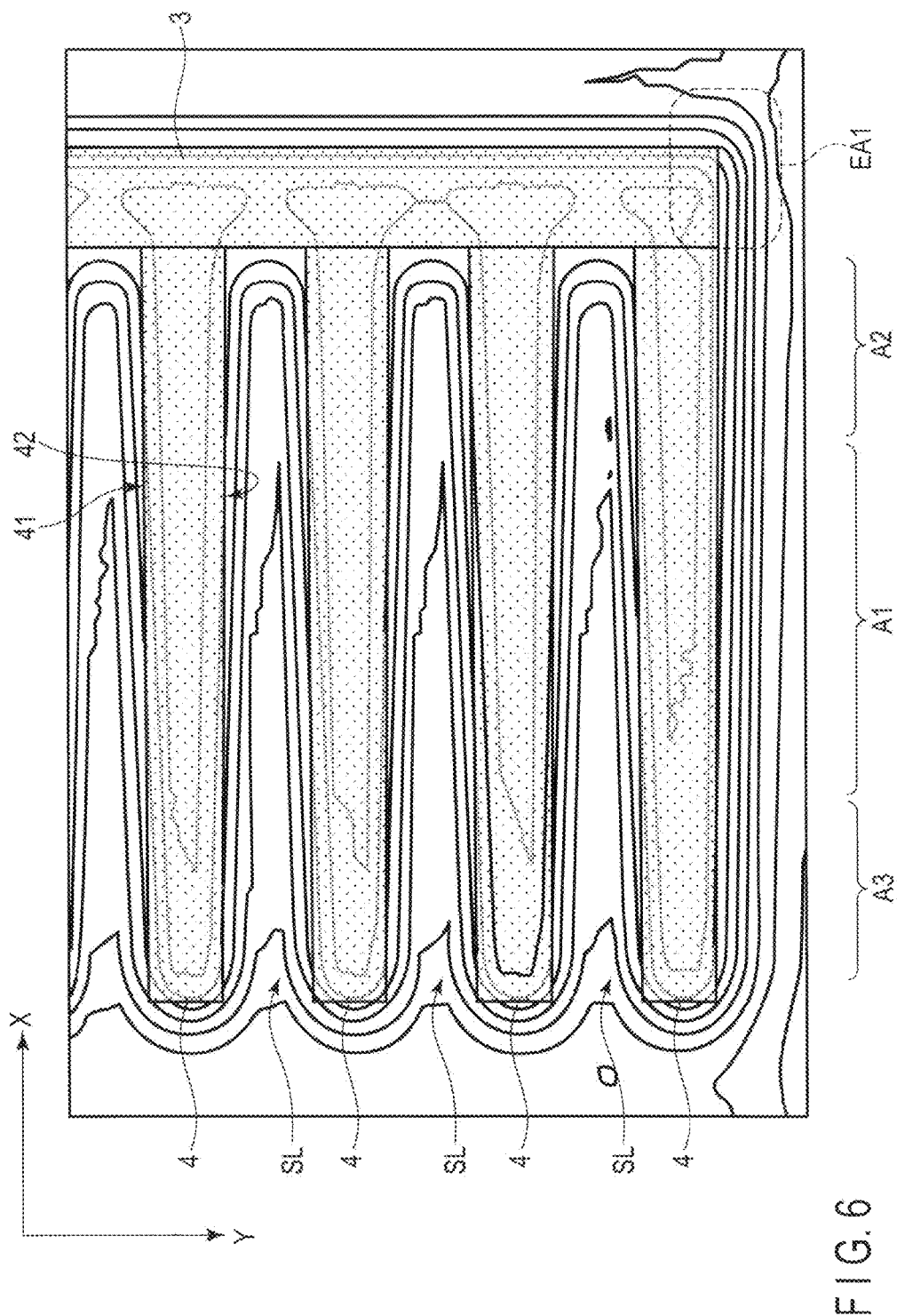
F I G. 6

DISPLAY DEVICE

CROSS-REFERENCE TO RELATED APPLICATIONS

This application is based upon and claims the benefit of priority from Japanese Patent Application No. 2014-172374, filed Aug. 27, 2014, the entire contents of which are incorporated herein by reference.

FIELD

Embodiments described herein relate generally to a display device.

BACKGROUND

An in-plane-switching (IPS) mode liquid crystal display device is known as an example of display devices. An IPS mode liquid crystal display device includes a pair of substrates used to seal a liquid crystal layer therein, and a pixel electrode and a common electrode are provided with one of the substrate. In the IPS mode liquid crystal display device, a transverse field produced between these electrodes is used to control the alignment of the liquid crystal molecules in the liquid crystal layer. Further, a fringe field switching (FFS) mode liquid crystal display device is commercially used. In an FFS mode liquid crystal display device, a pixel electrode and a common electrode are arranged on different layers and a fringe field produced therebetween is used to control the liquid crystal molecules.

Here, a high-speed transverse field mode liquid crystal display device is known as a liquid crystal display device with faster response and improved alignment stability as compared to the conventional FFS mode one. In the high-speed transverse field mode liquid crystal display device, a pixel electrode and a common electrode are arranged in different layers and a slit is provided with the electrode which is closer to the liquid crystal layer to rotate the liquid crystal molecules in the proximity of the sides of the slit facing each other in its width direction such that the liquid crystal molecules at one side and the liquid crystal molecules at the other side are rotated in reverse.

As to such a high-speed transverse field mode liquid crystal display device, further improvement of the alignment stability is demanded.

BRIEF DESCRIPTION OF THE DRAWINGS

FIG. 6 is a view used for explanation of the high-speed transverse field mode and shows equipotential lines in the liquid crystal layer.

DETAILED DESCRIPTION

In general, according to one embodiment, a display device includes a first substrate with a first alignment film, a second substrate with a second alignment film, and a liquid crystal layer interposed between the first and the second alignment film. The first substrate has a first electrode, a second electrode opposed to the first electrode with an insulating layer interposed therebetween, and a first alignment film covering the second electrode. The second substrate includes a second alignment film opposed to the first alignment film. The liquid crystal layer includes liquid crystal molecules sealed between the first alignment film and the second alignment film. An initial alignment direction of liquid crystal molecules of the liquid crystal layer is parallel to a first direction or a direction which is orthogonal to the first direction. The second electrode includes a plurality of comblike electrodes extending parallel to the first direction and arranged along a second direction which crosses the first direction, and a connecting portion which connects the comblike electrodes and extends in the second direction. The connecting portion includes a projection which projects in the second direction more than an outermost comblike electrode of the comblike electrodes.

Embodiments are described with reference to accompanying drawings.

Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the Figures as compared to actual embodiments for the sake of simpler explanation, and they are not to limit the interpretation of the invention of the present application. Furthermore, in the description and figures of the present application, structural elements having the same or similar functions will be referred to by the same reference numbers and detailed explanations of them that are considered redundant may be omitted.

First Embodiment

Figure 1:
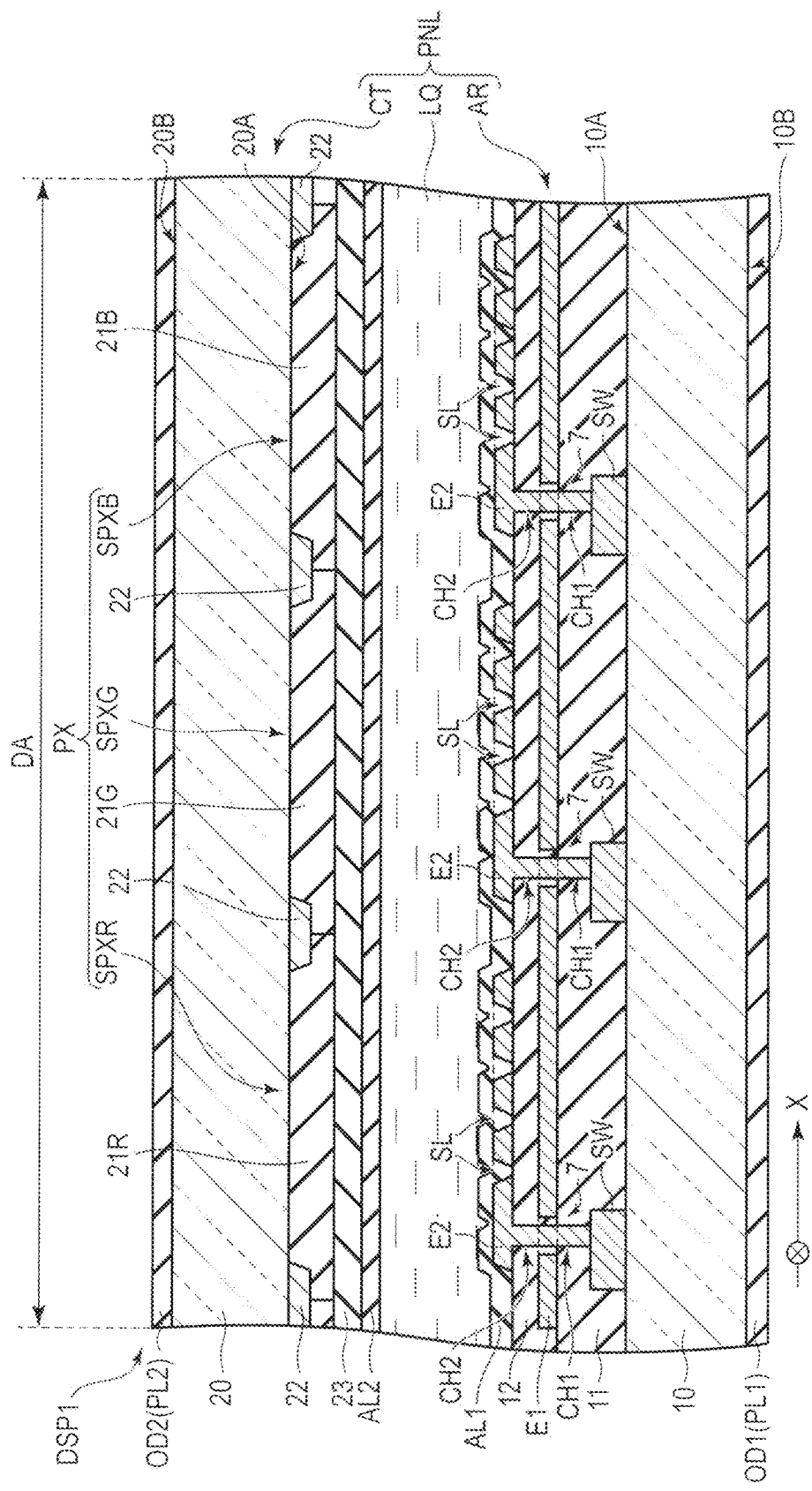
FIG. 1 is a cross-sectional view which shows a part of the structure of a liquid crystal display device of a first embodiment.

FIG. 1 is a cross-sectional view which shows a part of a liquid crystal display device DSP1 of the first embodiment. The liquid crystal display device DSP1 includes, for example, a transmissive display panel PNL of active matrix type.

The display panel PNL includes a plurality of unit pixels PX in a display area DA used for image display. A unit pixel PX is a minimum unit of a color image displayed on the display area DA, and includes a plurality of subpixels SPX corresponding to different colors. In the example of FIG. 1, a unit pixel PX is composed of subpixels SPXR, SPXG, and SPXB corresponding to red, green, and blue arranged in a first direction X. Note that a unit pixel PX may include a subpixel SPX corresponding to white in addition to subpixels SPXR, SPXG, and SPXB.

The display panel PNL includes an array substrate AR, counter substrate CT arranged to be opposed to the array substrate AR, and liquid crystal layer LQ sealed in the array substrate AR and the counter substrate CT. In the present embodiment, liquid crystal molecules included in the liquid crystal layer LQ possess positive dielectric anisotropy.

The array substrate AR includes a first insulating substrate 10 such as a light transmissive glass substrate or resin substrate. The first insulating substrate 10 has a first main surface 10A opposed to the counter substrate CT and a second main surface 10B opposite to the first main surface 10A.

Furthermore, the array substrate AR includes, at the first main surface 10A side of the first insulating substrate 10, a switching element SW, first electrode E1 (lower electrode), second electrode E2 (upper electrode), first insulating layer 11, second insulating layer 12, and first alignment film AL1.

The switching element SW is disposed on a subpixel SPX. The switching element SW is provided with the first main surface 10A of the first insulating substrate 10 and is covered with the first insulating layer 11. The first electrode E1 is formed on the first insulating layer 11.

In the example of FIG. 1, the first electrode E1 is provided to be common to the subpixels SPXR, SPXG, and SPXB. The second electrode E2 is individually provided with the subpixels SPXR, SPXG, and SPXB. Furthermore, the first electrode E1 includes openings 7 positioned to be opposed to the second electrodes E2 of the subpixels SPXR, SPXG, and SPXB.

The first electrode E1 is covered with the second insulating layer 12. The second electrode E2 is formed on the second insulating layer 12 and is opposed to the first electrode E1. In the example of FIG. 1, the second electrode E2 includes a plurality of slits SL.

The second electrodes E2 are electrically connected to the switching elements SW of the subpixels SPXR, SPXG, and SPXB, respectively, through the openings 7, contact holes CH1 provided with the first insulating layer 11, and contact holes CH2 provided with the second insulating layer 12.

In the present embodiment, the first electrode E1 functions as a common electrode to which a common voltage is supplied, and each of the second electrode E2 functions as a pixel electrode to which a voltage is supplied selectively as to its corresponding subpixel SPX. The first electrode E1 and the second electrode E2 are formed of a transparent conductive material such as indium tin oxide (ITO) or indium zinc oxide (IZO).

The first alignment film AL1 covers the second electrode E2 and contacts the liquid crystal layer LQ. An alignment treatment such as rubbing treatment or optical alignment treatment has been performed to the first alignment film AL1.

Conversely, the counter substrate CT includes a second insulating substrate 20 such as light transmissive glass substrate or resin substrate. The second insulating substrate 20 has a first main surface 20A opposed to the array substrate AR and a second main surface 20B opposite to the first main surface 20A.

Furthermore, the counter substrate CT includes, at the first main surface 20A side of the second insulating substrate 20, color filters 21R, 21G, and 21B, light shielding black matrix 22 (light shielding layer), overcoat layer 23, and second alignment film AL2.

Color filter 21R is formed of, for example, a resin material colored red and is arranged to correspond to the red subpixel SPXR. Color filter 21G is formed of, for example, a resin material colored green and is arranged to correspond to the green subpixel SPXG. Color filter 21B is formed of, for example, a resin material colored blue and is arranged to correspond to the blue subpixel SPXB.

The black matrix 22 defines subpixels SPXR, SPXG, and SPXB. Boundaries of color filters 21R, 21G, and 21B overlap the black matrix 22. The overcoat layer 23 covers color filters 21R, 21G, and 21B and evens the surfaces of color filters 21R, 21G, and 21B.

The second alignment film AL2 covers the overcoat layer 23 and contacts the liquid crystal layer LQ. As with the first alignment film AL1, an alignment treatment such as a rubbing treatment or an optical alignment treatment has been performed to the second alignment film AL2.

On the outer surface of the array substrate AR, that is, on the second main surface 10B of the first insulating substrate 10, a first optical element OD1 including a first polarizer PL1 is disposed. Furthermore, on the outer surface of the counter substrate CT, that is, on the second main surface 20B of the second insulating substrate 20, a second optical element OD2 including a second polarizer PL2 is disposed. A first polarization axis (first absorption axis) of the first polarizer PL1 and a second polarization axis (second absorption axis) of the second polarizer PL2 are orthogonal to each other as in a crossed-Nicol relationship.

The liquid crystal display device DSP1 with the above structure selectively transmits incident light from the first optical element OD1 through subpixels SPX to display an image in the display area DA.

Figure 2:
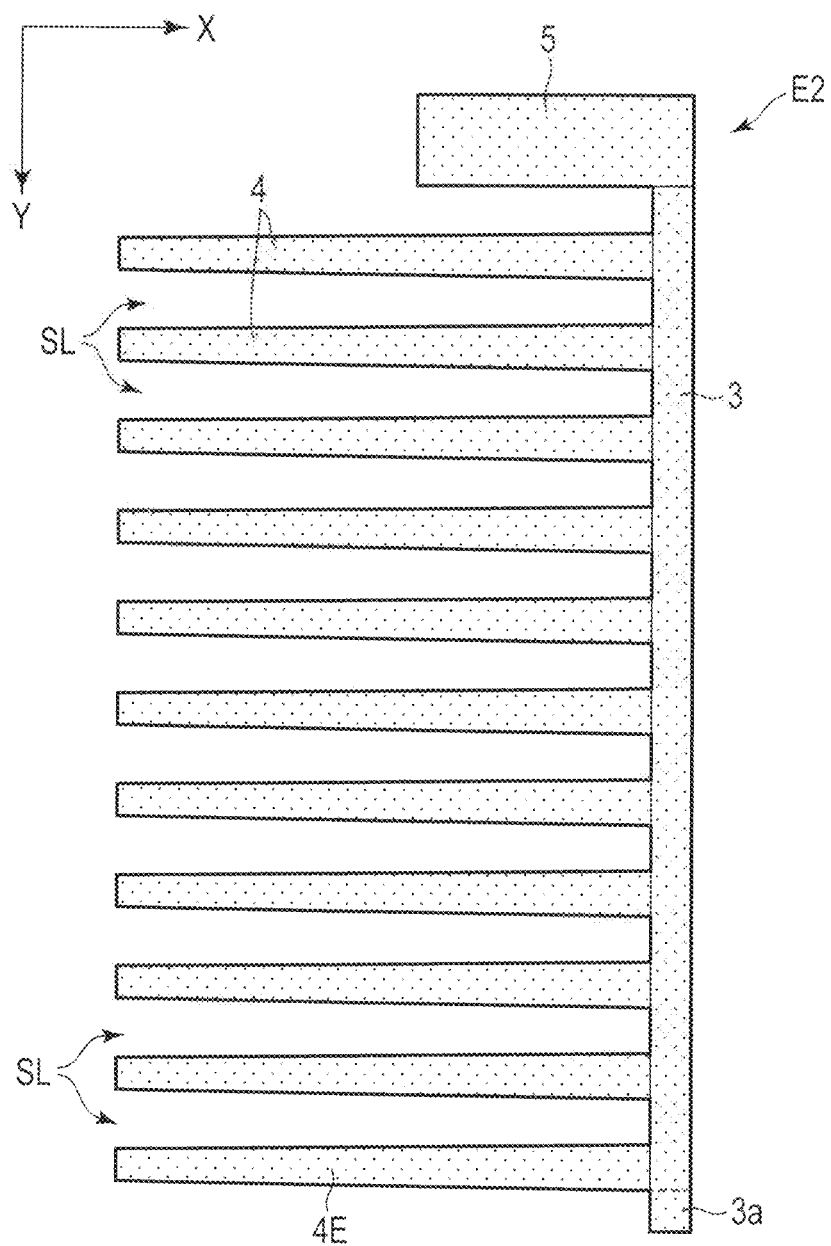
FIG. 2 schematically shows an example of a shape applicable to a second electrode shown in FIG. 1.

FIG. 2 schematically shows an example of the shape of the second electrode E2 of FIG. 1. The second electrode E2 as depicted includes a connecting portion 3 extending in a second direction Y which crosses a first direction X, a plurality of comblike electrodes 4 extending from one side of the connecting portion 3, and contact portion 5 provided with one end of the connecting portion 3. In the example of FIG. 2, the second direction Y is orthogonal to the first direction X.

Comblike electrodes 4 extend parallel to the first direction X and are arranged along the second direction Y with certain intervals. In the example of FIG. 2, comblike electrodes 4 are trapezoids tapered toward their tips; however, they may be formed in other shapes such as rectangle. A space between adjacent comblike electrodes 4 corresponds to a slit SL. Slits SL extends parallel to the first direction X as comblike electrodes 4.

The connecting portion 3 has a projection 3a which projects in the second direction Y more than comblike electrode 4E positioned outermost (at the lower end of the figure) amongst the comblike electrodes 4 in the second direction Y.

Figure 3:
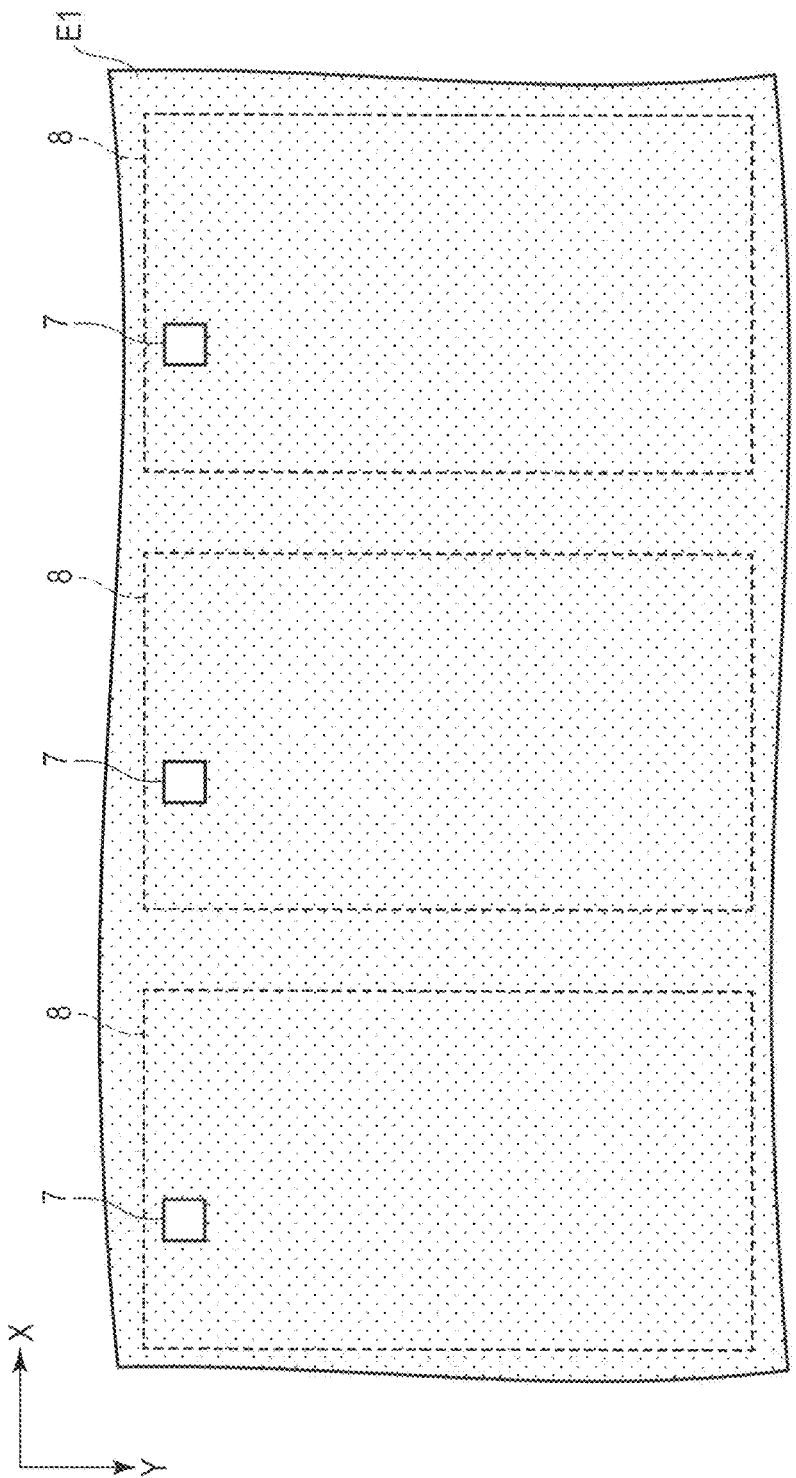
FIG. 3 schematically shows an example of a shape applicable to a first electrode shown in FIG. 1.

FIG. 3 schematically shows an example of the shape of the first electrode E1 of FIG. 1. In this example, areas 8 opposed to respective second electrodes E2 of the subpixels SPX are depicted by dotted lines.

The first electrode E1 includes the openings 7 at positions corresponding to contact holes CH1 and CH2. Except the openings 7, the first electrode E1 is shaped continuously without a slit.

Figure 4:
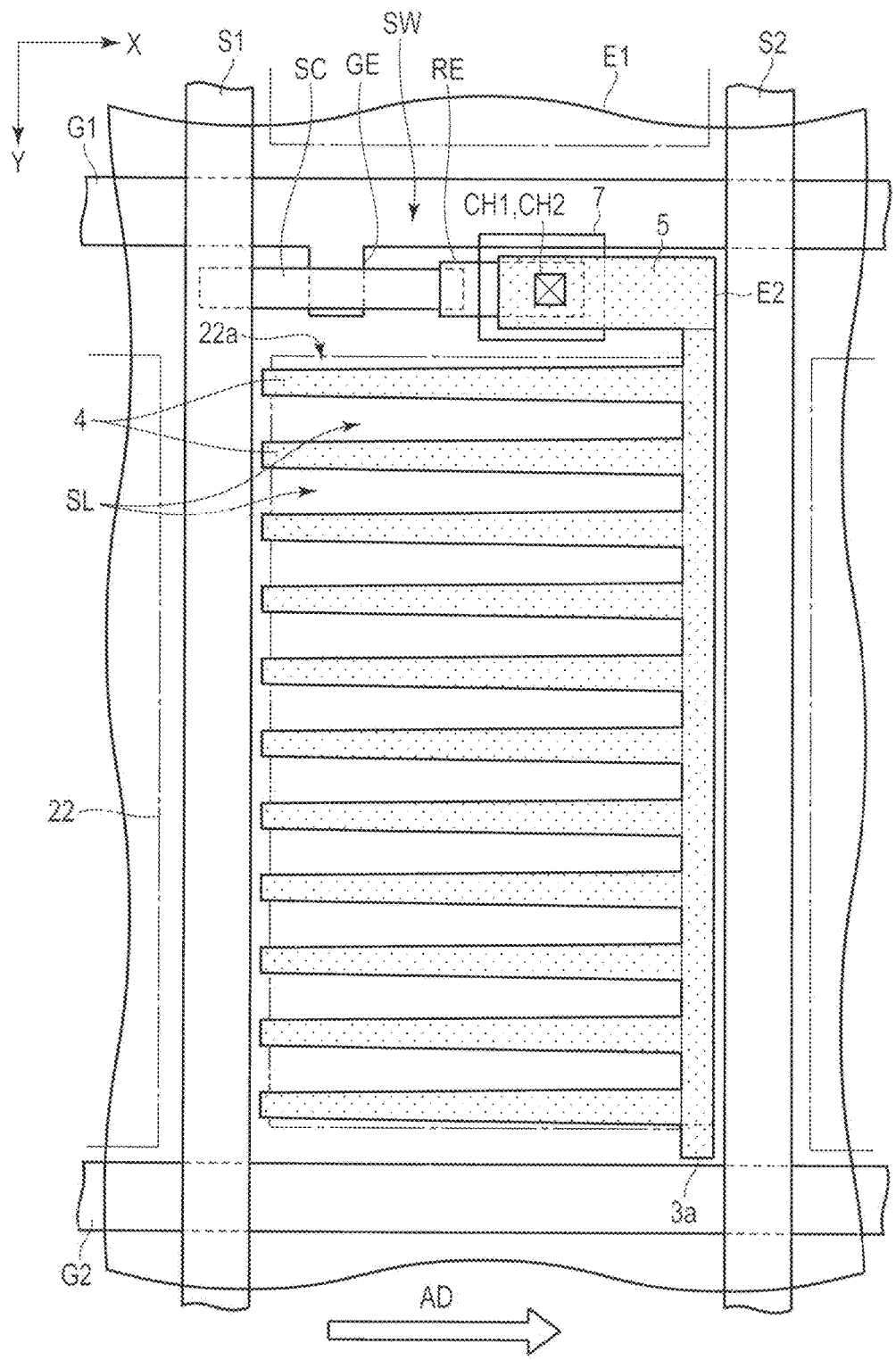
FIG. 4 is a plan view which shows a layout example of a subpixel composed of the second electrode shown in FIG. 2 and the first electrode shown in FIG. 3.

FIG. 4 is a plan view which shows a layout example of a subpixel SPX composed of the second electrode E2 of FIG. 2 and the first electrode E1 of FIG. 3. In the example depicted, the area of the subpixel SPX is defined by gate lines G1 and G2 extending parallel to each other in the first direction X and source lines S1 and S2 extending parallel to each other in the second direction Y.

The switching element SW includes a semiconductor layer SC, gate electrode GE, and relay electrode RE. One end of the semiconductor layer SC is electrically connected to source line S1 and the other end of the semiconductor layer SC is electrically connected to the relay electrode RE. Between these ends, the semiconductor layer SC faces the gate electrode GE. The gate electrode GE is formed integrally with gate line G1, for example. The relay electrode RE is electrically connected to the contact portion 5 of the first electrode E1 through contact hole CH1.

In FIG. 4, alternate long and short dashed lines indicate the edge of the black matrix 22. That is, the black matrix 22 is opposed to gate lines G1 and G2, source lines S1 and S2, switching element SW, and contact portion 5. The black matrix 22 forms a pixel opening 22a within the area surrounded by gate lines G1 and G2 and source lines S1 and S2.

Comblike electrodes 4 of the second electrode E2 extend within the pixel opening 22a. In the example of FIG. 4, the projection 3a of the connecting portion 3 faces the black matrix 22. Therefore, even if the alignment is disordered in the proximity of the projection 3a, affection caused by the disorder to the display image is reduced.

The first alignment film AL1 in FIG. 1 has been subjected to an alignment treatment to align the molecules in an alignment treatment direction AD which is parallel to the first direction X. On the other hand, the second alignment film AL2 has been subjected to an alignment treatment to align the molecules in the alignment treatment direction AD or in the opposite direction. That is, in the liquid crystal display device DSP1 of the present embodiment, the direction in which the comblike electrodes 4 and the slits SL extend and the alignment treatment direction AD (initial alignment direction of the liquid crystal molecules) are substantially the same.

As explained above, the first electrode E1 and the second electrode E2 are opposed to each other with the second insulating layer 12 interposed therebetween, and the comblike electrodes 4 are provided with the second electrode E2 which is positioned at the liquid crystal layer LQ side in such a manner that the comblike electrodes 4 and the slits SL extend to conform to the alignment treatment direction AD. With this structure, a high-speed transverse field mode with faster response as compared to a conventional FFS mode can be achieved in the present embodiment. The response speed mentioned here will be defined as a speed of transition of photo-transmissivity of the liquid crystal layer LQ within certain degrees by applying a voltage between the first electrode E1 and the second electrode E2.

A principle of the high-speed transverse field mode will be explained with reference to FIGS. 5 to 8. Note that, in FIGS. 6 to 8, the connecting portion 3 of the second electrode E2 does not have a projection 3a for the sake of comparison to the present embodiment.

Figure 5:
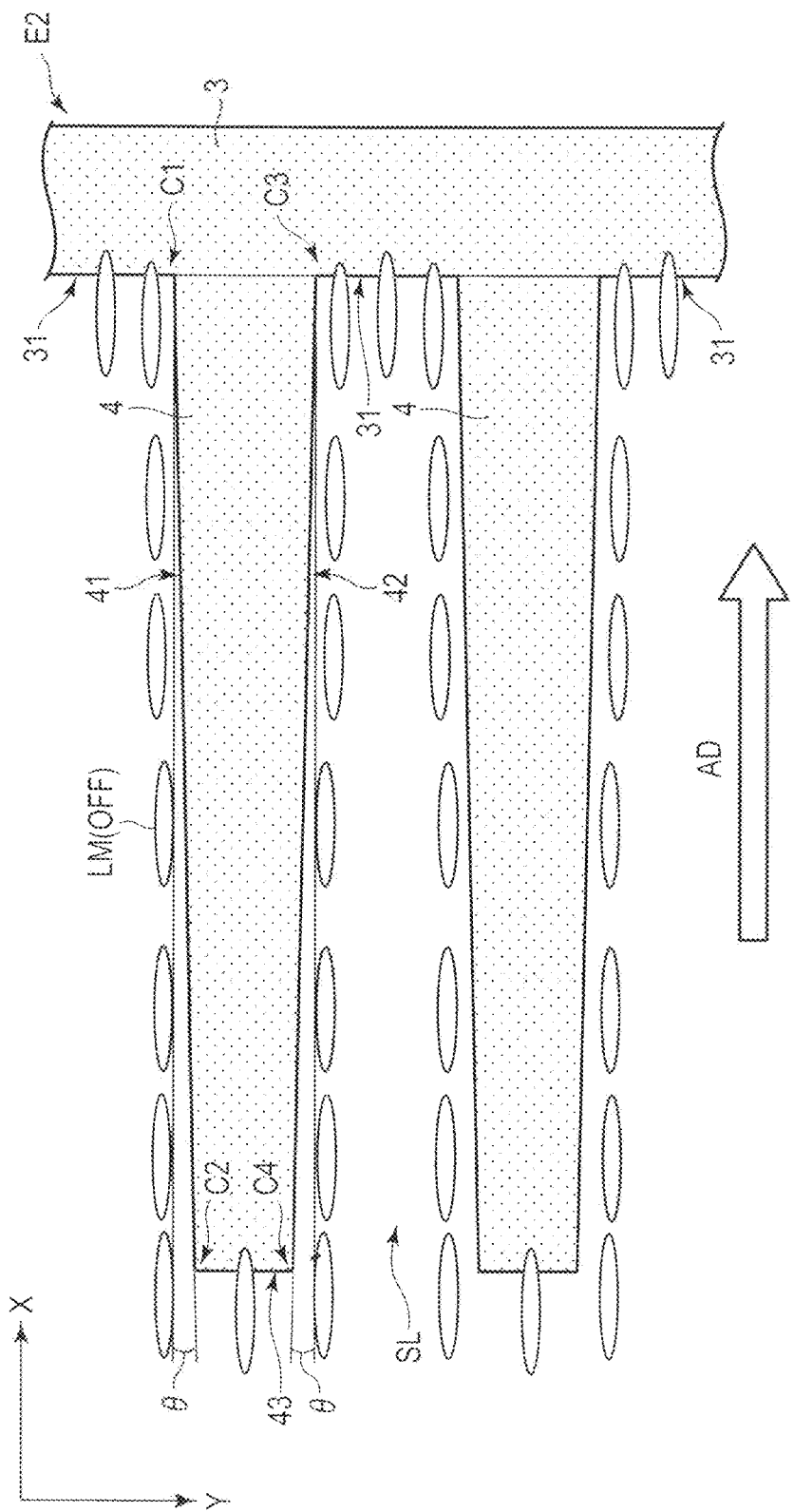
FIG. 5 is a view used for explanation of a high-speed transverse field mode and shows a part of the second electrode and an initial alignment state of liquid crystal molecules in a liquid crystal layer.

FIG. 5 shows a part of the second electrode E2 and liquid crystal molecules LM in their initial alignment state in the liquid crystal layer LQ. A comblike electrode 4 of the second electrode E2 has a pair of first side 41 and second side 42 opposed to each other in the width direction (second direction Y) and a top side 43 bridging between the first side 41 and the second side 42. The first side 41 is inclined clockwise at an acute angle θ (approximately 1.0 degrees in FIGS. 5 to 8) with respect to the alignment treatment direction AD and second side 42 is inclined counterclockwise at angle θ with respect to the alignment treatment direction AD. Furthermore, between two adjacent comblike electrodes 4, a base side 31 is formed by the connecting portion 3. The base side 31 and the first side 41 form a corner C1, the first side 41 and the top side 43 form a corner C2, the base side 31 and the second side 42 form a corner C3, and the second side 42 and the top side 43 form a corner C4.

In an off-state where no voltage is applied between the first electrode E1 and the second electrode E2, liquid crystal molecules LM are in the initial alignment such that their longitudinal axes conform to the alignment treatment direction AD as shown in FIG. 5. That is, in the example of FIG. 5, the initial alignment direction of the liquid crystal molecules LM is parallel to the first direction X.

In an on-state where a voltage is applied between the first electrode E1 and the second electrode E2, a field is produced between these electrodes. FIG. 6 shows equipotential lines of the liquid crystal layer LQ in the produced field. The equipotential lines represent the potential on the X-Y plane at a certain height from the first alignment film AL1, and a direction perpendicular to the equipotential lines corresponds to the direction of the field.

Equipotential lines near the first side 41 and the second side 42 become substantially parallel to these sides in a middle area A1 of the comblike electrodes 4 in the first direction X. Equipotential lines are bent at approximately 180 degrees in an arc shape along the shape of the slit SL in a base area A2 near the connecting portion 3. Furthermore, equipotential lines are bent at approximately 180 degrees in an arc shape along the shape of the comblike electrode 4 in a top area A3 near the top side 43.

Note that the connecting portion 3 of the second electrode E2 does not include a projection 3a in FIG. 6. As is evident from an edge area EA1 near the end of the connecting portion 3 in the second direction Y, equipotential lines are dense as compared to the other areas. That is, the field in edge area EA1 is stronger than in the other areas.

Figure 7:
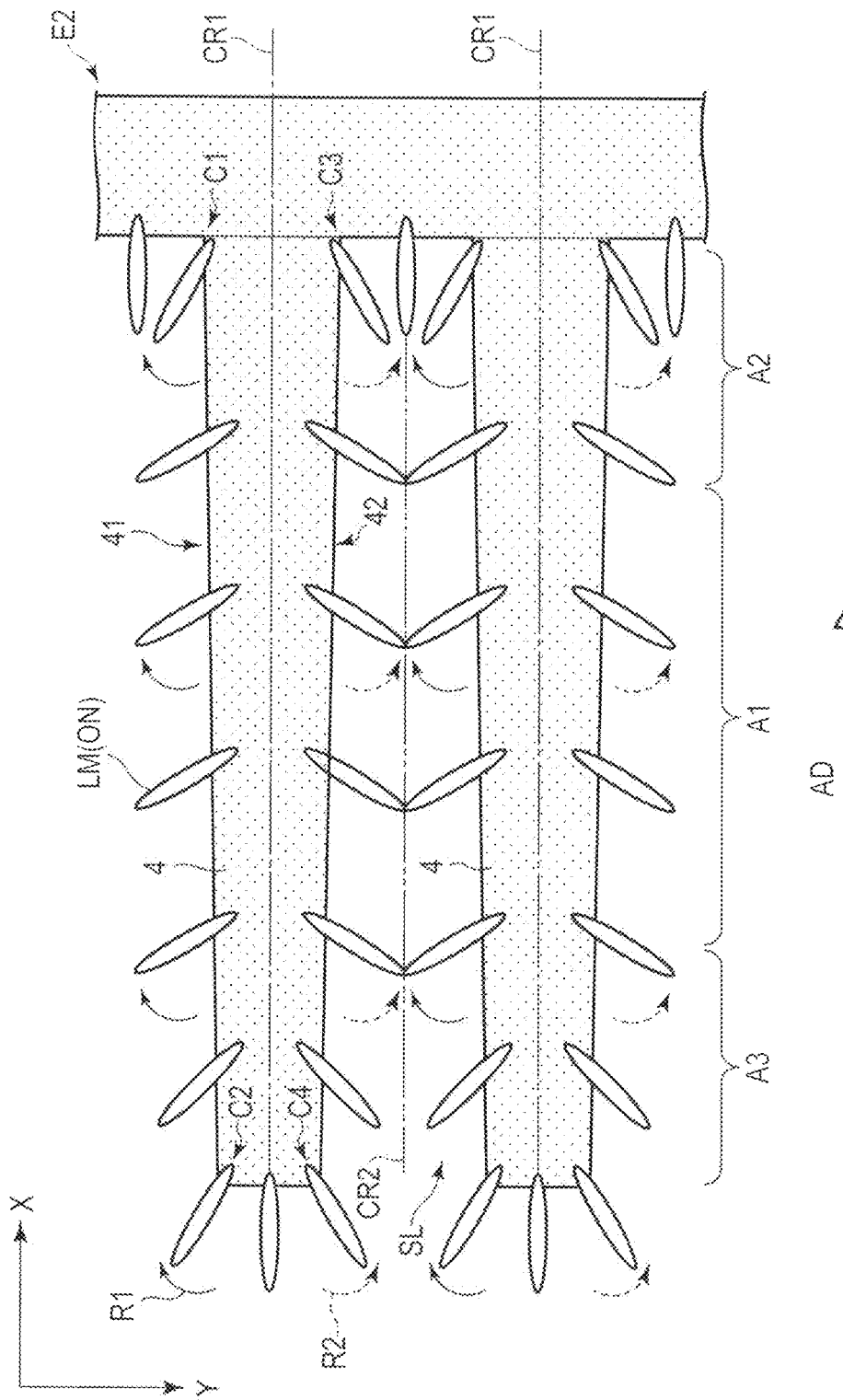
FIG. 7 is a view used for explanation of the high-speed transverse field mode and shows an alignment state of liquid crystal molecules in an on-state.

FIG. 7 shows an alignment state of liquid crystal molecules LM in the on-state. The liquid crystal molecules LM of the present embodiment possess positive dielectric anisotropy. Thus, upon application of a voltage between the first electrode E1 and the second electrode E2 in the off-state in FIG. 5, a force is produced to rotate the liquid crystal molecules LM in such a manner that their longitudinal axes become parallel to the direction of the field produced by the application of a voltage (or, their longitudinal axes become orthogonal to the equipotential lines).

In the proximity of corners C1 and C2, liquid crystal molecules LM rotate in a first rotational direction R1 which is indicated by a solid arrow. Furthermore, in the proximity of corners C3 and C4, liquid crystal molecules LM rotate in a second rotational direction R2 which is indicated by a dotted line. The first rotational direction R1 is opposite to the second rotational direction R2. In the example of FIG. 7, the first rotational direction R1 is clockwise and the second rotational direction R2 is counterclockwise.

An alignment control function which controls a rotational direction of liquid crystal molecules LM in the proximity of the first side 41 and the second side (in other words, an alignment stabilization function) is imparted to each of corners C1 to C4. That is, liquid crystal molecules LM in the proximity of the first side 51 rotate in the first rotational direction R1 according to the rotation of the liquid crystal molecules LM in the proximity of corners C1 and C2. Liquid crystal molecules LM in the proximity of the second side 42 rotate in the second rotational direction R2 according to the rotation of the liquid crystal molecules LM in the proximity of corners C3 and C4. Here, focusing on the proximity of the center CR1 of the comblike electrode 4 and the proximity of the center CR2 of the slit SL in the second direction Y, the liquid crystal molecules LM rotating in the first rotational direction R1 and the liquid crystal molecules LM rotating in the second rotational direction R2 counterbalance with each other. Therefore, liquid crystal molecules LM in the proximity of these centers are maintained in their initial alignment state and rotate very little.

As can be understood from the above, in the high-speed transverse field mode, rotational directions of the liquid crystal molecules LM are regular from the base side 31 to the top side 43 in the proximity of the first side 41 and the second side 42. Consequently, the response speed in the application of a voltage can be increased, and alignment stability can be improved because irregularity of rotational directions of the liquid crystal molecules LM is suppressed.

Furthermore, even if the alignment of the liquid crystal molecules LM is temporarily disordered by an external impact, the alignment directions of the liquid crystal molecules in the proximity of the first side 41 and the second side 42 can be restored based on the works of the liquid crystal molecules LM in the proximity of corners C1 to C4.

Note that the first side 41 and the second side 42 are inclined with respect to the alignment treatment direction AD, and this structure helps the improvement of the alignment stability. Specifically, in the proximity of the first side 41 and the second side 42 those are inclined with respect to the alignment treatment direction AD, the direction of the field crosses the alignment treatment direction AD at any angle except right angles, and thus, the rotational directions of the liquid crystal molecules LM in the application of a voltage can be set substantially regular. As is evident from FIG. 6, the first side 41 and the second side 42 are substantially parallel to the equipotential lines, and thus, the function of corners C1 to C4 weakens in the middle area A1. This will be adverse to the alignment stability. However, with the first side 41 and the second side 42 inclined with respect to the alignment treatment direction AD, excellent alignment stability can be secured in the middle area A1.

Figure 8:
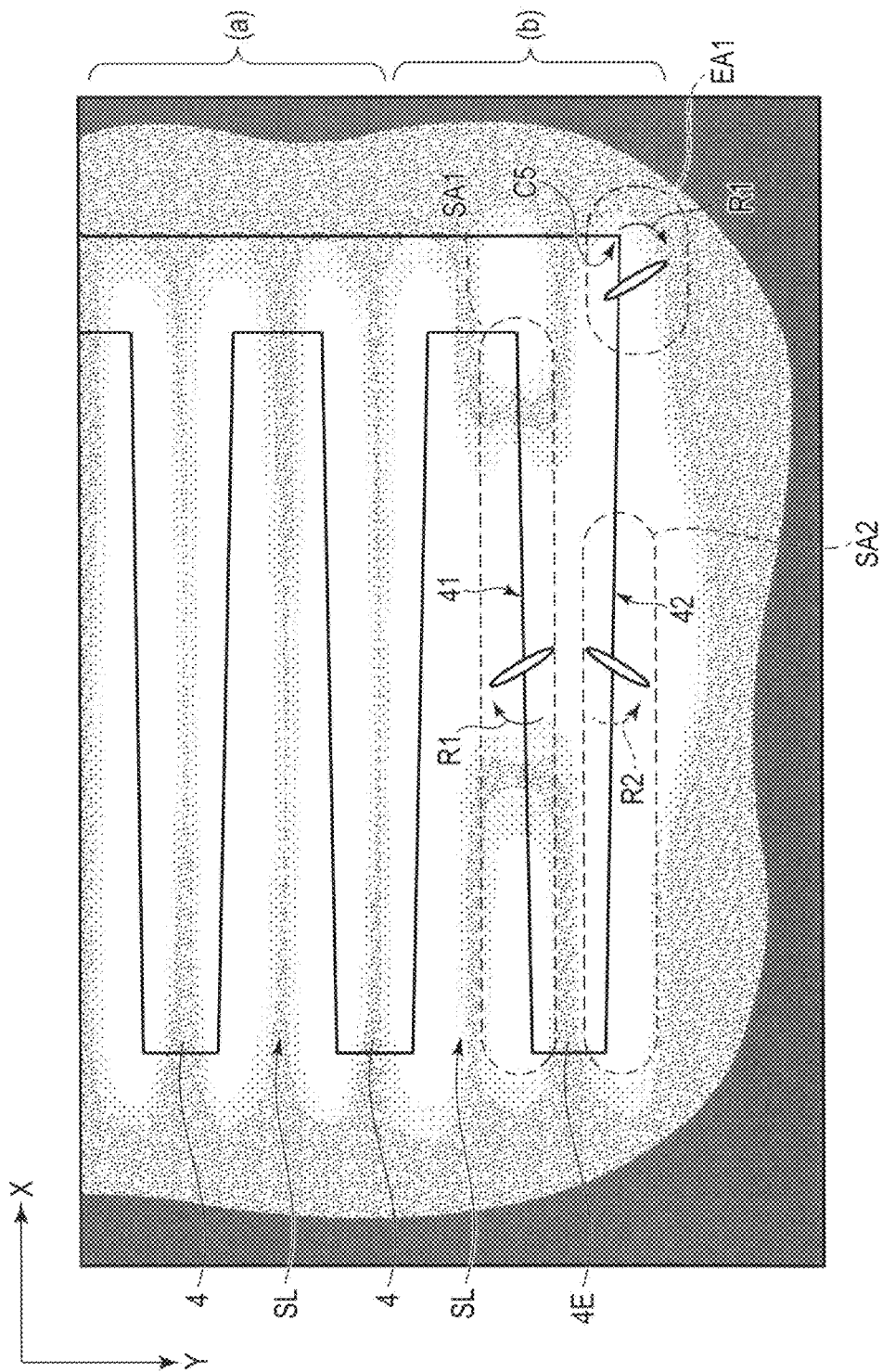
FIG. 8 is a view used for explanation of the high-speed transverse field mode and shows luminosity distribution of light passing through a subpixel in the on-state.

FIG. 8 shows luminosity distribution of light passing through a subpixel SPX in the on-state. On gray scale, the luminosity becomes higher in brighter parts and becomes lower in darker parts. In the off-state of FIG. 5, light incident on the first optical element OD1 partially passes through the first polarizer PL1 and enters the display panel PNL. The light which enters the display panel PNL is linearly polarized light orthogonal to a first polarization axis of the first polarizer PL1. The polarization of such linearly polarized light hardly changes when passing through the display panel PNL in the off-state. Therefore, the linearly polarized light which passes through the display panel PNL is absorbed by the second polarizer PL2 which is in a crossed-Nicol relationship with the first polarizer PL1.

Conversely, the polarization of light which passes through the first polarizer PL1 and enters the display panel PNL in the on-state shown in FIG. 7 changes when passing through the liquid crystal layer LQ based on an alignment state of liquid crystal molecules LM (or retardation in the liquid crystal layer). Therefore, the light which passes through the liquid crystal layer LQ partially passes through the second polarizer PL2 in the proximity of the first side 41 and the second side 42 where the liquid crystal molecules LM are rotated from their initial alignment state. Consequently, the luminosity in the proximity of the first side 41 and the second side 42 becomes high as shown in FIG. 8. Conversely, the luminosity in the proximity of the center CR1 of the comblike electrode 4 and the center CR2 of the slit SL becomes low since the liquid crystal molecules LM therein rotate very little from their initial alignment state.

Part (a) of FIG. 8 corresponds to an area excluding the proximity of the outermost comblike electrode 4E in the second direction Y, and therein, areas of high luminosity corresponding to the first side 41 and the second side 42 and areas of low luminosity in the proximity of the middle of the first side 41 and the second side 42 appear alternately. That is, the luminosity distribution is regular.

Conversely, part (b) of FIG. 8 corresponds to an area in the proximity of the outermost comblike electrode 4E, and therein, the luminosity distribution is disordered. The disorder is caused by edge area EA1 which affects the alignment stability of the liquid crystal molecules LM. That is, as aforementioned with reference to FIG. 6, the field in edge area EA1 is stronger in comparison with that in the other areas, and thus, a strong alignment regulation force is applied to the liquid crystal molecules LM in the proximity of edge area EA1. The alignment regulation force affects the other liquid crystal molecules LM around edge area EA1, and consequently, the alignment in the proximity of comblike electrode 4E is disordered.

For example, when a voltage is applied between the first electrode E1 and the second electrode E2, liquid crystal molecules LM in the proximity of edge area EA1 rotate in the first rotational direction R1 by the alignment control function of corner C5 of the connecting portion 3. Furthermore, in a first side area SA1 which is near the first side 41 of comblike electrode 4E, liquid crystal molecules LM rotate in the first rotational direction R1. Thus, the liquid crystal molecules LM between edge area EA1 and the first side area SA1 rotate in the first rotational direction R1, and consequently, a continuous area of high luminosity may be generated therebetween as in area (b) of FIG. 8. In the example of FIG. 8, the area of high luminosity connects with an area of high luminosity generated near the second side 42 of the comblike electrode 4 adjacent to comblike electrode 4E.

Furthermore, comblike electrode 4E does not have a corner C4 at its end of the second side 42 unlike the other comblike electrodes 4. That is, the alignment control function by corner C4 does not work in the proximity of the second side 42 of comblike electrode 4E, and accordingly, alignment stability therein may be poor as compared to that of the other comblike electrodes 4.

Furthermore, in the second side area SA2 in the proximity of the second side 42 of comblike electrode 4E, liquid crystal molecules LM rotate in the second rotational direction R2; however, the alignment thereof may be disordered by the opposite rotation of the liquid crystal molecules LM in edge area EA1, which goes in the first rotational direction R1.

In the present embodiment, the disorder of the alignment stability in the proximity of comblike electrode 4E can be prevented by the projection 3a of the connecting portion 3. Hereinafter, this effect will be explained.

Figure 9:
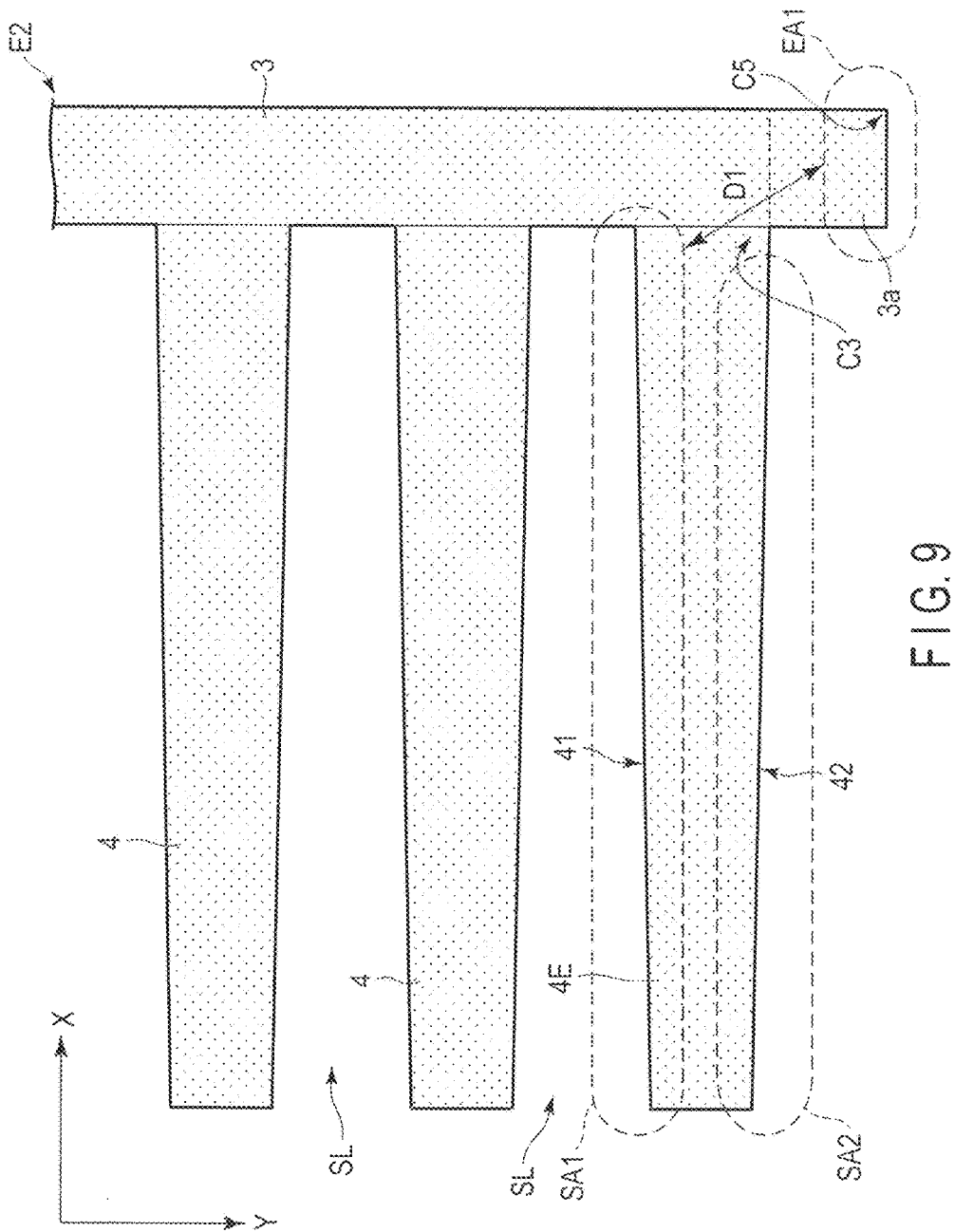
FIG. 9 shows an example of an effect of the first embodiment.

FIG. 9 schematically shows a part of the second electrode E2 of the present embodiment. As shown in the figure, the projection 3a of the connecting portion 3 of the second electrode E2 extends a distance D1 between edge area EA1 and the first side area SA1 in the proximity of the first side 41 of comblike electrode 4E. The effect from edge area EA1 upon the first side area SA1 can be reduced and the alignment stability in the proximity of comblike electrode 4E can be improved.

Furthermore, the projection 3a and the second side 42 of comblike electrode 4E can create a corner C3 as in the other comblike electrodes 4, and accordingly, the alignment stability in the second side area SA2 can be secured as in the proximity of the second sides 42 of the other comblike electrodes 4.

In addition to the above effect, various suitable effects can be obtained by the structure described above.

Second Embodiment

Now, the second embodiment will be explained.

The present embodiment provides a method of reducing alignment disorder in the proximity of an end of a second electrode E2 in the second direction Y, which is different from that of the first embodiment. Unless otherwise specified, the present embodiment has the same structure as the first embodiment.

Figure 10:
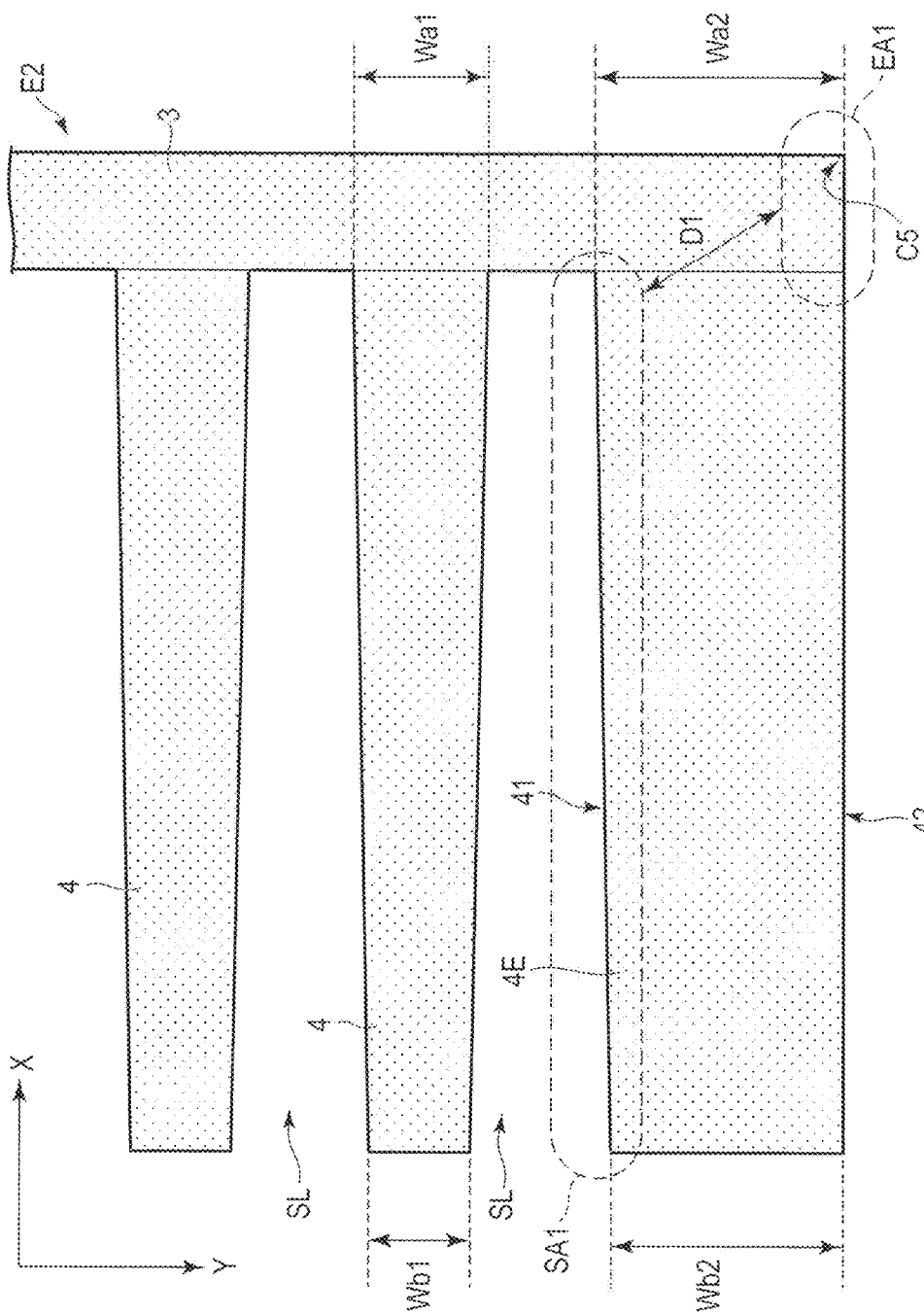
FIG. 10 schematically shows a part of the structure of a second electrode of a second embodiment.

FIG. 10 schematically shows a part of the second electrode E2 of the present embodiment. The second electrode E2 includes a connecting portion 3 extending along the second direction Y and a plurality of comblike electrodes 4 extending from one side of the connecting portion 3 in the first direction X. In the present embodiment, the connecting portion 3 does not have a projection 3a which is shown in FIG. 9 or the like.

The comblike electrodes 4 each have a width Wa1 in the second direction Y at their base ends and a width Wb1 in the second direction Y at their tips, except comblike electrode 4E disposed at the outermost end in the second direction Y. Comblike electrode 4E has a width Wa2 in the second direction Y at its base end wherein Wa2 is greater than Wa1 (Wa2>Wa1). Furthermore, comblike electrode 4E has a width Wb2 in the second direction at its tip wherein Wb2 is greater than Wb1 (Wb2>Wb1). That is, comblike electrode 4E of the example of FIG. 10 is wider in its entirety than the other comblike electrodes 4.

As can be understood from the above, a distance D1 between edge area EA1 of the connecting portion 3 and the first side area SA1 can be extended by increasing the width of comblike electrode 4E disposed at the outermost end in the second direction Y. Accordingly, the effect from edge area EA1 upon the first side area SA1 or the like can be reduced and the alignment stability in the proximity of comblike electrode 4E can be improved.

Third Embodiment

Now, the third embodiment will be explained. Structures the same as or similar to those of the first embodiment will be referred to by the same reference numbers and their detailed description will be omitted.

Figure 11:
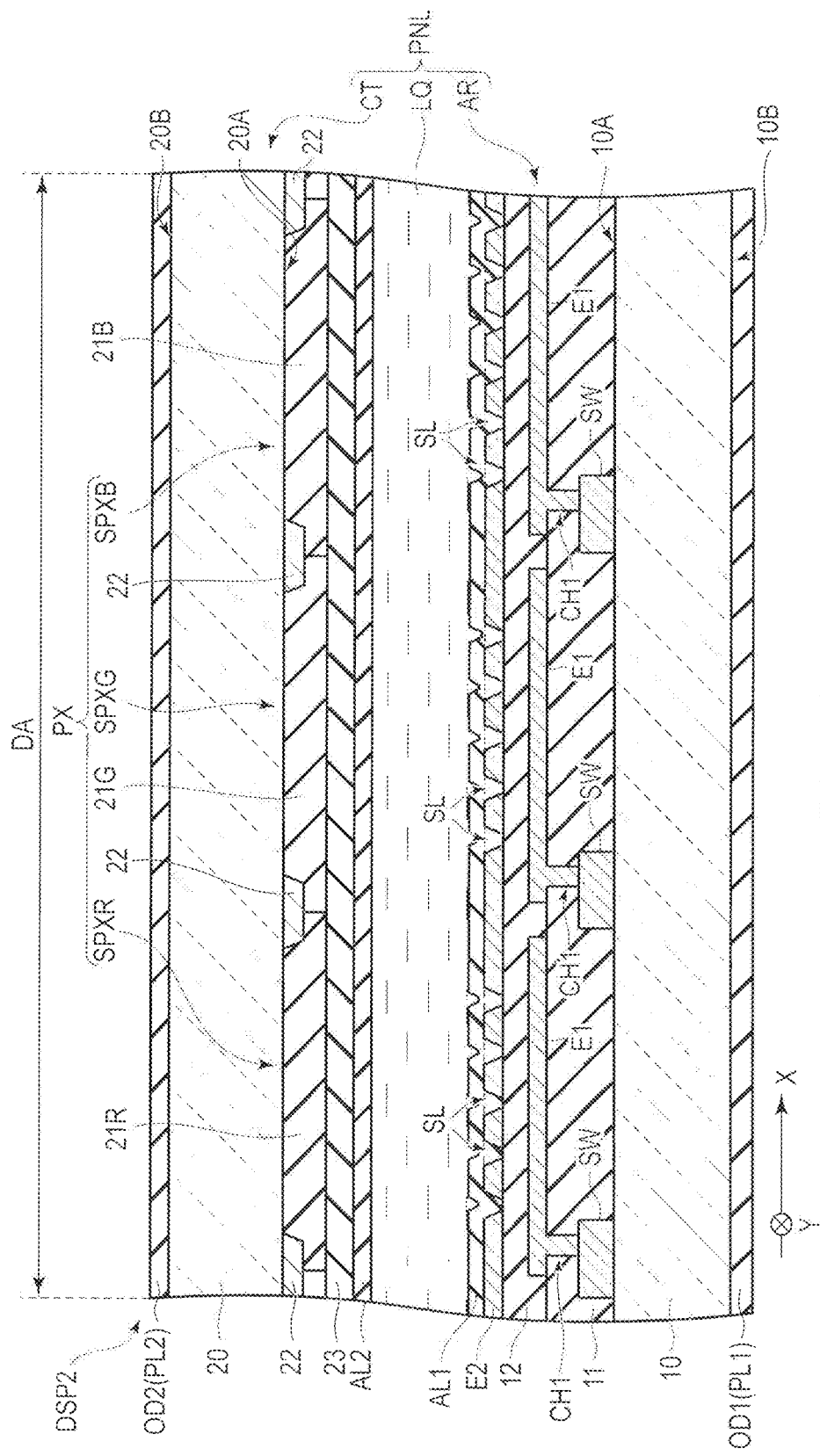
FIG. 11 is a cross-sectional view which shows a part of the structure of a liquid crystal display device of a third embodiment.

FIG. 11 is a cross-sectional view which shows a part of the structure of a liquid crystal display device DSP2 of the present embodiment. In the liquid crystal display device DSP2, the first electrode E1 functions as a pixel electrode and the second electrode E2 functions as a common electrode. In this respect, the liquid crystal display device DSP2 differs from the liquid crystal display device DSP1 of the first embodiment.

The first electrode E1 is individually provided with subpixels SPXR, SPXG, and SPXB and is electrically connected to a switching element SW through a contact hole CH1 provided with ah insulating layer 11.

The second electrode E2 is provided to be common to the subpixels SPXR, SPXG, and SPXB. The second electrode E2 includes a plurality of slits SL in the subpixels SPXR, SPXG, and SPXB.

In the present embodiment, liquid crystal molecules in the liquid crystal layer LQ possess positive dielectric anisotropy as in the first embodiment.

Figure 12:
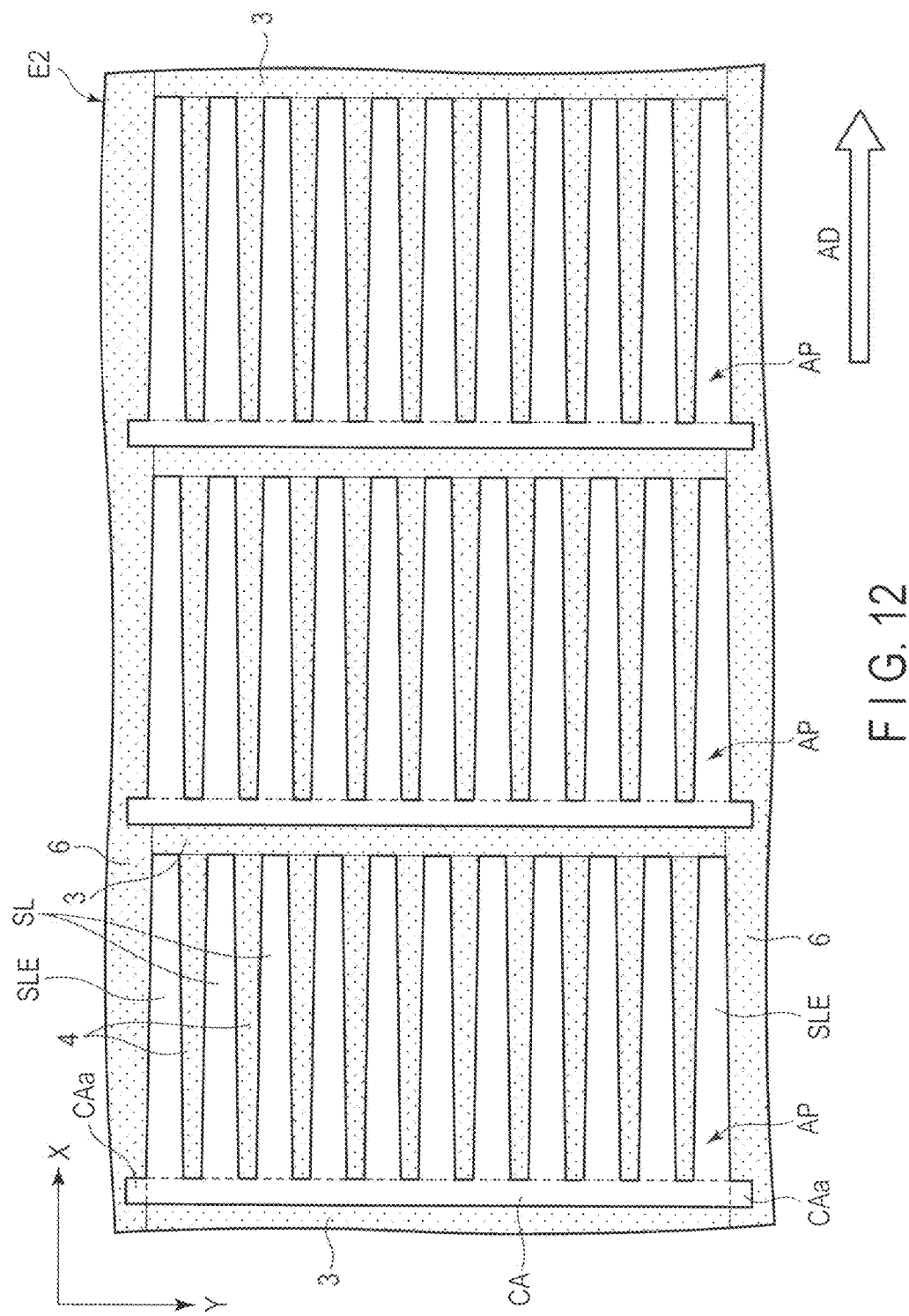
FIG. 12 schematically shows an example of a shape applicable to a second electrode shown in FIG. 11.

FIG. 12 schematically shows an example of the shape of the second electrode E2 of FIG. 11. The second electrode E2 as depicted includes a plurality of apertures AP. The apertures AP are disposed at positions opposed to the first electrode E1 of each subpixel SPX.

The apertures AP are closed by the connecting portions 3 extending in the second direction Y and connecting portions 6 extending in the first direction X. A plurality of comblike electrodes 4 extend from one side of each connecting portion 3.

Comblike electrodes 4 extend parallel to the first direction X and are tapered toward their tips. Comblike electrodes 4 extending from a single connecting portion 3 are arranged along the second direction Y with certain intervals. Slits SL are defined by the comblike electrodes 4 within an aperture AP. Slits SL extend parallel to the first direction X along with the comblike electrodes 4.

Within an aperture AP, the part excluding the slits SL corresponds to a continuous aperture CA. The continuous aperture CA extends along the second direction Y to connect the ends of the slits SL within an aperture AP such that the slits SL therein can communicate with each other.

A continuous aperture CA has a projection CAa extending in the second direction Y more than the outermost slit SLE of the slits SL in an aperture AP. In the example of FIG. 12, each continuous aperture CA has the projections CAa at both ends in the second direction Y.

The first alignment film AL1 shown in FIG. 11 has been subjected to an alignment treatment to align the molecules in an alignment treatment direction AD which is parallel to the first direction X. The second alignment film AL2 has been subjected to an alignment treatment to align the molecules in an alignment treatment direction AD or in the opposite direction to the alignment treatment direction AD. That is, in the liquid crystal display device DSP2 of the present embodiment, the direction in which the comblike electrodes 4 and the slits SL extend and the alignment treatment direction AD (the initial alignment direction of the liquid crystal molecules) are substantially the same.

Figure 13:
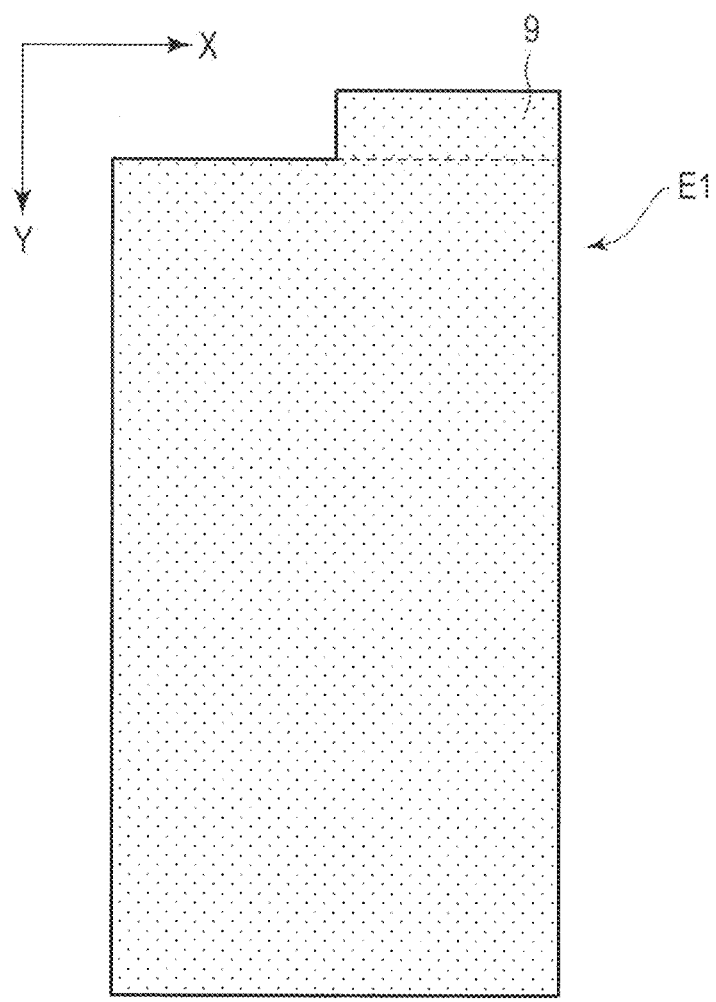
FIG. 13 schematically shows an example of a shape applicable to a first electrode shown in FIG. 11.

FIG. 13 schematically shows an example of the shape of the first electrode E1 of FIG. 11. The first electrode E1 in the figure is a flat uniform plate-like shape without any slit or the like formed therein, and is formed in a substantially rectangular shape of which length along the first direction is shorter than its length along the second direction Y. Furthermore, in the example depicted, the first electrode E1 has a contact 9 used for electrical connection with the switching element SW.

Figure 14:
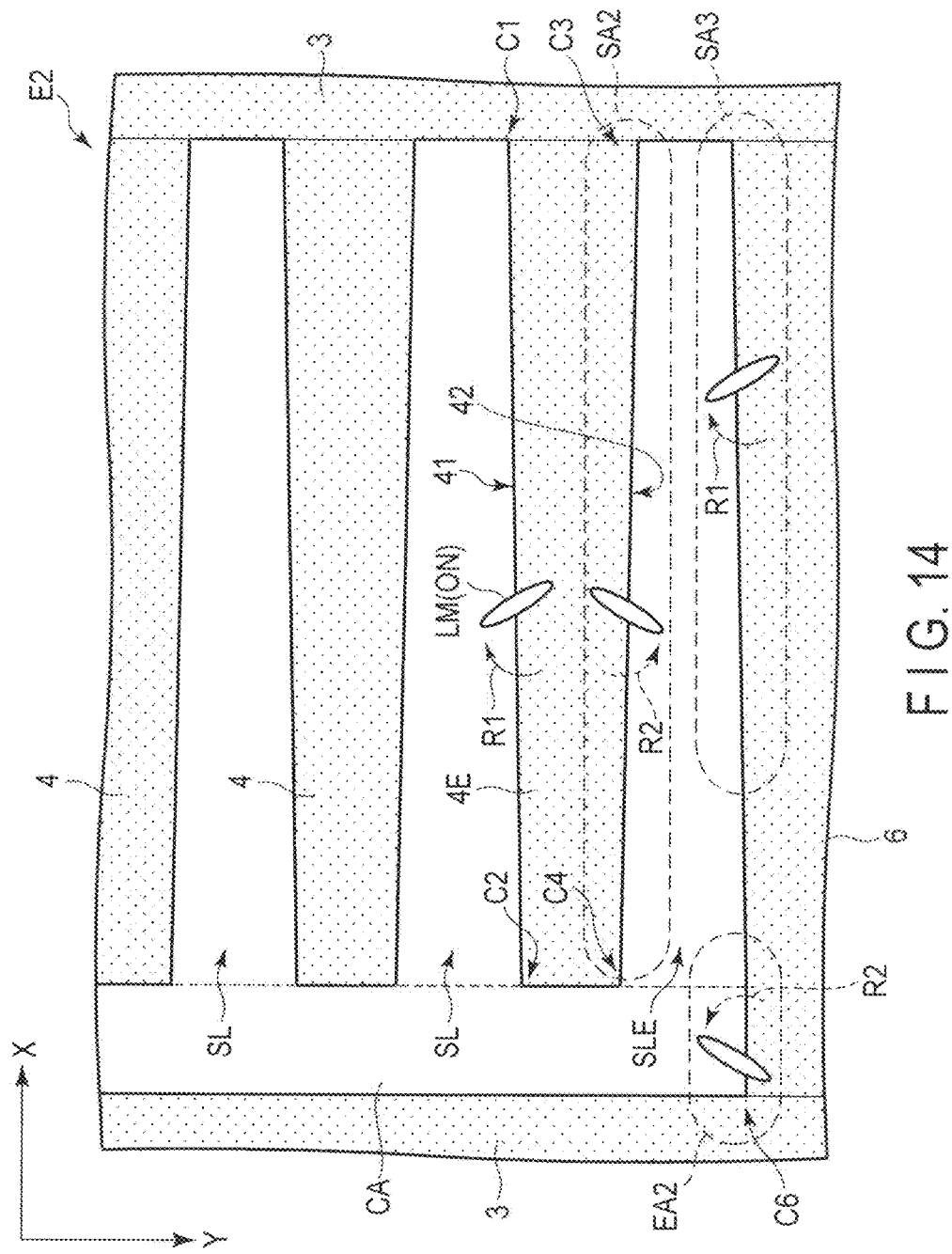
FIG. 14 shows an example of the behavior of liquid crystal molecules in the liquid crystal display device of the third embodiment.

FIG. 14 shows the behavior of liquid crystal molecules LM in the liquid crystal display device DSP2. FIG. 14 shows a second electrode E2 with a continuous aperture CA which does not have a projection CAa for the sake of comparison to the present embodiment.

Liquid crystal molecules LM in the proximity of the first side 41 and the second side 42 of the comblike electrode 4 behave similarly to those of the first embodiment. That is, in an off-state where no voltage is applied between the first electrode E1 and the second electrode E2, the liquid crystal molecules LM are in the initial alignment such that their longitudinal axes conform to the alignment treatment direction AD. That is, the initial alignment direction of the liquid crystal molecules LM is parallel to the first direction X.

If a voltage is applied between the first electrode E1 and the second electrode E2, the liquid crystal molecules LM in the proximity of the first side 41 rotate in the first rotational direction R1 from corner C1 to corner C2, and the liquid crystal molecules LM in the proximity of the second side 42 rotate in the second rotational direction R2 from corner C3 to corner C4. Therefore, in the liquid crystal display device DSP2 of the present embodiment, the high-speed transverse field mode can be achieved as well.

Here, in an edge area EA2 in the proximity of the end of the continuous aperture CA in the second direction Y, corner C6 of the continuous aperture CA (the corner of the connecting portions 3 and 6) performs the alignment control function which rotates the liquid crystal molecules Lm therein in the second rotational direction R2. Such an edge area EA2 may disorder the alignment of the liquid crystal molecules in the proximity of comblike electrode 4E (or slit SLE) as in edge area EA1 of the first embodiment. For example, the liquid crystal molecules LM in edge area EA2 and a second side area SA2 of comblike electrode 4E rotate in the second rotational direction R2. Thus, liquid crystal molecules LM between these areas rotate in the same second rotational direction R2 and a continuous area of high luminosity which is not generated around the other comblike electrodes 4 may be generated in the proximity of comblike electrode 4E.

Furthermore, slit SLE does not have a corner C2 which is formed at each joint of the other slits SL and the continuous aperture CA. That is, the alignment control function by corner C2 does not work in a third side area SA3 opposed to the second side area SA2 in the proximity of the second side 42 of comblike electrode 4E, and accordingly, alignment stability therein may be poor as compared to that of the other slits SL.

In the present embodiment, the disorder of the alignment stability in the proximity of slit SLE can be prevented by the projection CAa of the continuous aperture CA. Hereinafter, this effect will be explained.

Figure 15:
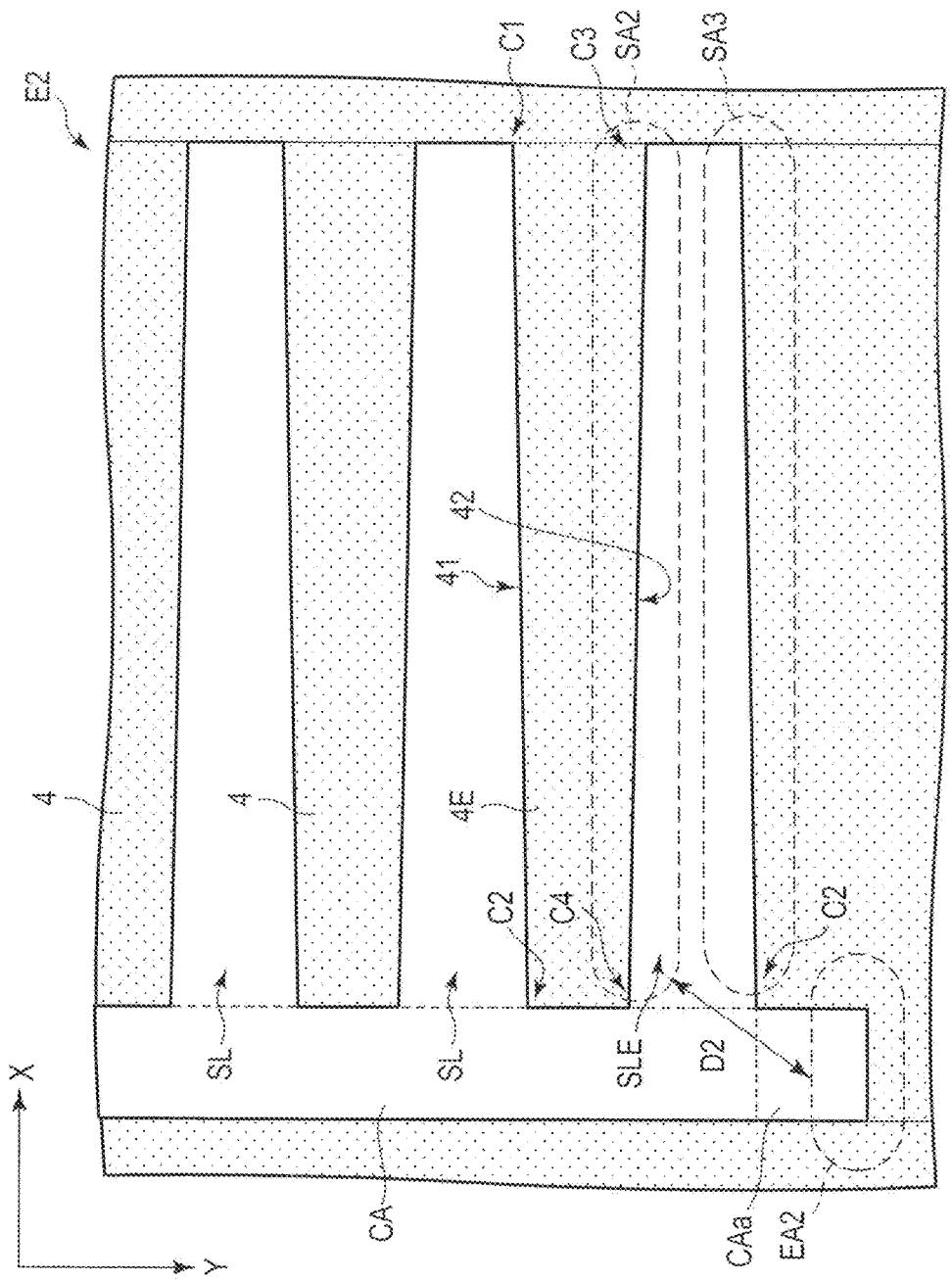
FIG. 15 shows an example of an effect of the third embodiment.

FIG. 15 schematically shows a part of the second electrode E2 of the present embodiment. As shown in the figure, the projection CAa of the continuous aperture CA of the second electrode E2 extends a distance D2 between edge area EA2 and the second side area SA2 in the proximity of the second side 42 of comblike electrode 4E. The effect from edge area EA2 upon the second side area SA2 can be reduced and the alignment stability in the proximity of comblike electrode 4E and slit SLE can be improved.

Furthermore, the projection CAa can create a corner C2 in the joint of slit SLE and the continuous aperture CA. Accordingly, the alignment stability in the third side area SA3 can be secured as in the second side area SA2 in the proximity of the other slits SL.

Note that, although FIG. 15 shows only one end of the continuous aperture CA, the same advantage can be obtained at the other end.

Fourth Embodiment

Now, the fourth embodiment will be explained.

The present embodiment provides a method of reducing alignment disorder in the proximity of an end of a second electrode E2 in the second direction Y, which is different from that of the third embodiment. This method is used when a first electrode E1 functions as a pixel electrode and a second electrode E2 functions as a common electrode. Unless otherwise specified, the present embodiment has the same structure as the third embodiment.

Figure 16:
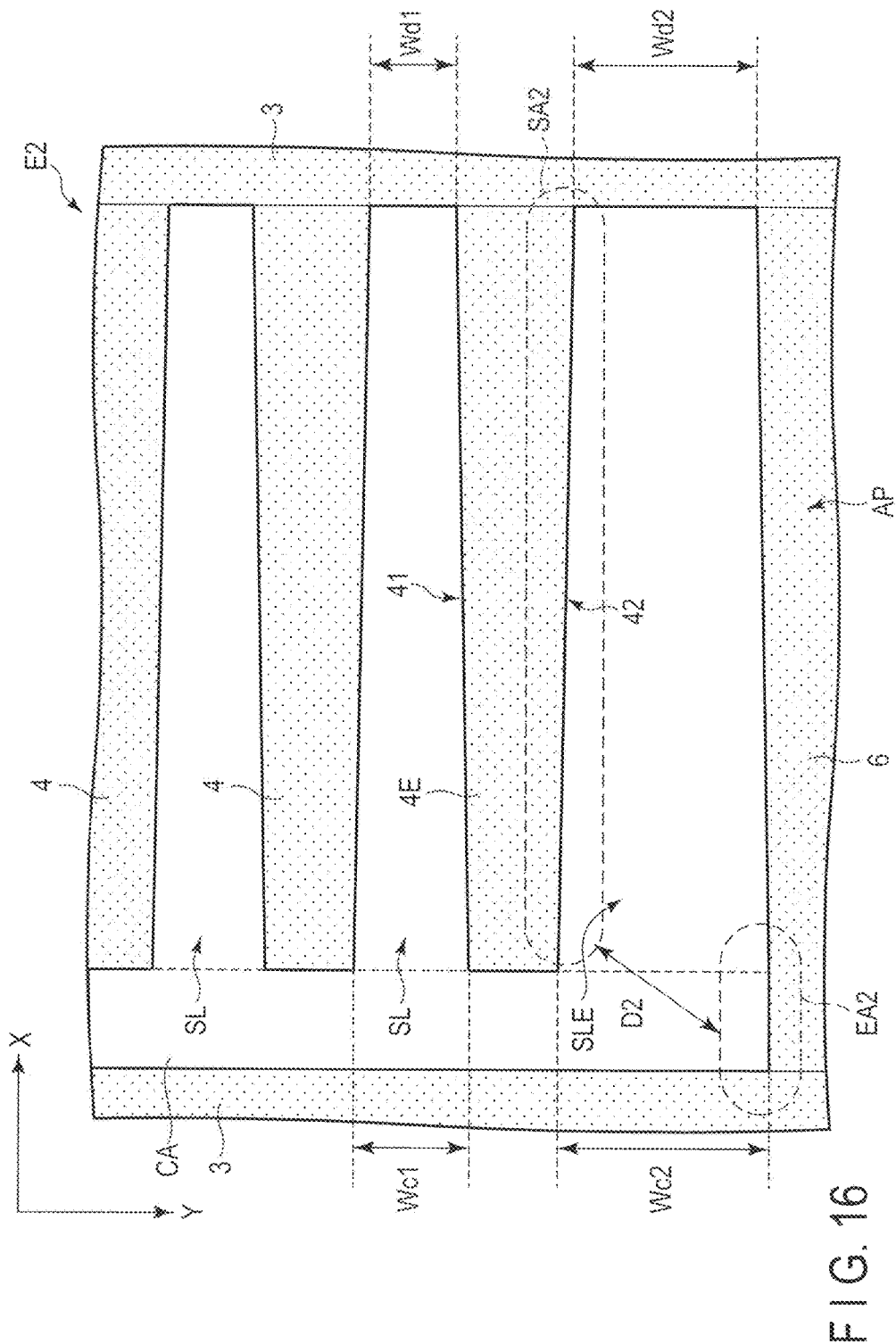
FIG. 16 schematically shows an example of a second electrode of a fourth embodiment.

FIG. 16 schematically shows a part of the second electrode E2 of the present embodiment. The second electrode E2 includes apertures AP which are closed by the connecting portions 3 extending in the second direction Y and connecting portions 6 extending in the first direction X as in the third embodiment. Furthermore, the second electrode E2 includes a plurality of comblike electrodes 4 extending from one side of each connecting portion 3 into the apertures AP. Comblike electrodes 4 extend parallel to the first direction X.

Slits SL extending parallel to the first direction X are formed by a plurality of comblike electrodes 4 and ends of the slits SL are connected by a continuous aperture CA extending in the second direction Y. Note that, in the present embodiment, the continuous aperture CA does not have a projection CAa shown in FIG. 13 or the like.

The slits SL each have a width Wc1 in the second direction Y at their base ends (joint positions with the continuous aperture CA) and a width Wd1 in the second direction Y at their tips, except slit SLE disposed at the outermost end in the second direction Y. Slit SLE has a width Wc2 in the second direction Y at its base end wherein Wc2 is greater than Wc1 (Wc2>Wc1). Furthermore, slit SLE has a width Wd2 in the second direction at its tip wherein Wd2 is greater than Wd1 (Wd2>Wd1). That is, slit SLE of the example of FIG. 16 is wider in its entirety than the other slits SL.

As can be understood from the above, a distance D2 between edge area EA2 of the continuous aperture CA and the second side area SA2 in the proximity of the second side 42 of comblike electrode 4E can be extended by increasing the width of slit SLE disposed at the outermost end in the second direction Y. Accordingly, the effect from edge area EA2 upon the second side area SA2 or the like can be reduced and the alignment stability in the proximity of comblike electrode 4E and slit SLE can be improved.

Fifth Embodiment

Now, the fifth embodiment will be explained. This embodiment is a variation of the first embodiment and has the same structure except the shape of the second electrode E2.

Figure 17:
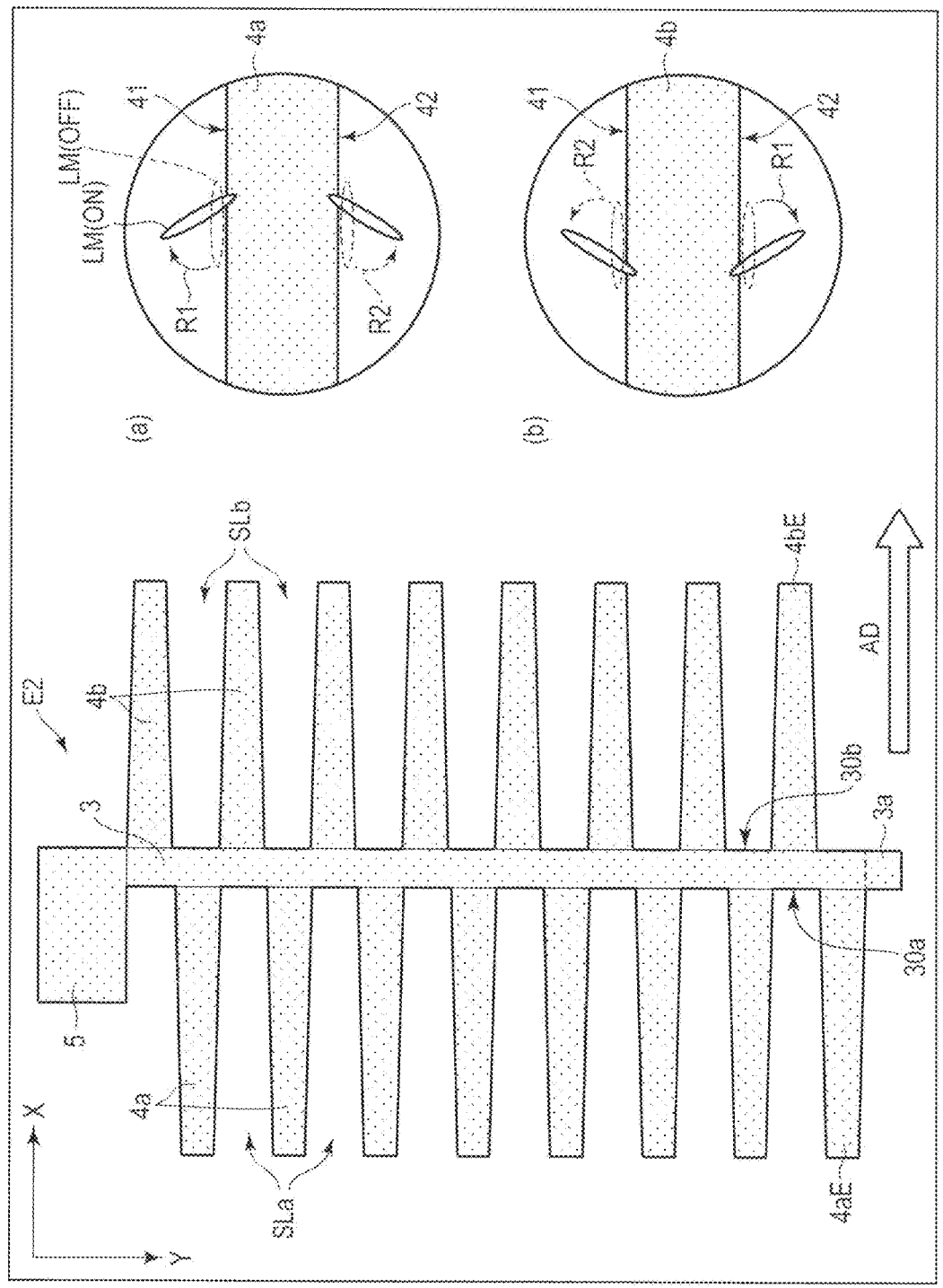
FIG. 17 schematically shows an example of a shape applicable to a second electrode of a fifth embodiment.

FIG. 17 schematically shows an example of the shape of the second electrode E2 of the present embodiment. In the example depicted, the second electrode E2 is formed in a double-edged manner such that comblike electrodes 4 extend from both a first side 30a and a second side 30b of the connecting portion 3 which extends along the second direction Y, and slits SL are defined at both sides of the connecting portion 3 by the comblike electrodes 4.

Specifically, comblike electrodes 4a extend from the first side 30a and comblike electrodes 4b extend from the second side 30b. Both comblike electrodes 4a and 4b extend parallel to the first direction X (alignment treatment direction AD) and are tapered toward their tips. Comblike electrodes 4a are arranged with certain intervals along the second direction Y. Furthermore, comblike electrodes 4b are arranged with certain intervals along the second direction Y. Slits SLa are defined by comblike electrodes 4a and slits SLb are defined by comblike electrodes 4b. Both slits SLa and SLb extend parallel to the first direction X as with comblike electrodes 4a and 4b.

In the example of FIG. 17, comblike electrodes 4a and 4b are formed in the same shape, and an arrangement pitch of each of comblike electrodes 4a adjacent in the second direction Y and an arrangement pitch of each of comblike electrodes 4b adjacent in the second direction Y are the same. Comblike electrodes 4a and 4b are arranged alternately in the second direction Y.

Note that comblike electrodes 4a and 4b may be formed in different shapes with different arrangement pitches. Furthermore, comblike electrodes 4a and 4b may not be arranged alternately in the second direction Y but may be arranged on single straight lines parallel to each other in the first direction X.

In the example of FIG. 17, the second electrode E2 has a comblike electrode 4aE which is disposed outermost amongst comblike electrodes 4a (at the lower end in the figure) and a comblike electrode 4bE which is disposed outermost amongst comblike electrodes 4b (at the lower end in the figure), and comblike electrode 4bE is arranged closer to the contact portion 5 (upper in the figure) as compared to comblike electrode 4aE. The connecting portion 3 has a projection 3a which projects in the second direction Y more than comblike electrode 4aE and 4bE.

Liquid crystal molecules LM in the proximity of comblike electrodes 4a behave the same as in the first embodiment. That is, as shown in FIG. 17(a), if a voltage is applied between the first electrode E1 and the second electrode E2, the liquid crystal molecules LM in the proximity of the first side 41 of comblike electrode 4a rotate in the first rotational direction R1 through the entirety of the first side 41, and oppositely, the liquid crystal molecules LM in the proximity of the second side 42 rotate in the second rotational direction R2 through the entirety of the second side 42.

Conversely, as shown in FIG. 17(b), the liquid crystal molecules LM in the proximity of the first side 41 of comblike electrode 4b rotate in the second rotational direction R2 through the entirety of the first side 41, and oppositely, the liquid crystal molecules in the proximity of the second side 42 rotate in the first rotational direction R1 through the entirety of the second side 42.

In the second electrode E2 structured as above, the alignment of the liquid crystal molecules LM in the proximity of comblike electrodes 4aE and 4bE may be disordered by the effect of the end area of the connecting portion 3. However, the connecting portion 3 of the present embodiment has a projection 3a which can reduce the effect of the end area of the connecting portion 3 upon the liquid crystal molecules LM in the proximity of comblike electrodes 4aE and 4bE as in the first embodiment. Thus, the alignment stability can be improved.

Note that, as in the example of FIG. 17, if comblike electrodes 4a and 4b are arranged alternately in the second direction Y, the first side 41 of comblike electrode 4a and the second side 42 of comblike electrode 4b are arranged basically on the same straight line, and the second side 42 of comblike electrode 4a and the first side 41 of comblike electrode 4b are arranged basically on the same straight line. Furthermore, since comblike electrodes 4a and comblike electrodes 4b extend in the opposite directions, the liquid crystal molecules LM in the proximity of the first side 41 of comblike electrode 4a and the liquid crystal molecules LM in the proximity of the second side 42 of comblike electrode 4b rotate in the same direction. Furthermore, the liquid crystal molecules LM in the proximity of the second side 42 of comblike electrode 4a and the liquid crystal molecules LM in the proximity of the first side 41 of comblike electrode 4b rotate in the same direction. That is, the liquid crystal molecules LM in the proximity of comblike electrodes 4a and 4b of which sides are arranged basically on the straight line in the first direction X rotate in the same direction, and the response speed can be increased more.

Sixth Embodiment

Now, the sixth embodiment will be explained.

The present embodiment provides another method of reducing alignment disorder in the double-edged second electrode E2 of the fifth embodiment. Unless otherwise specified, the present embodiment has the same structure as the fifth embodiment.

Figure 18:
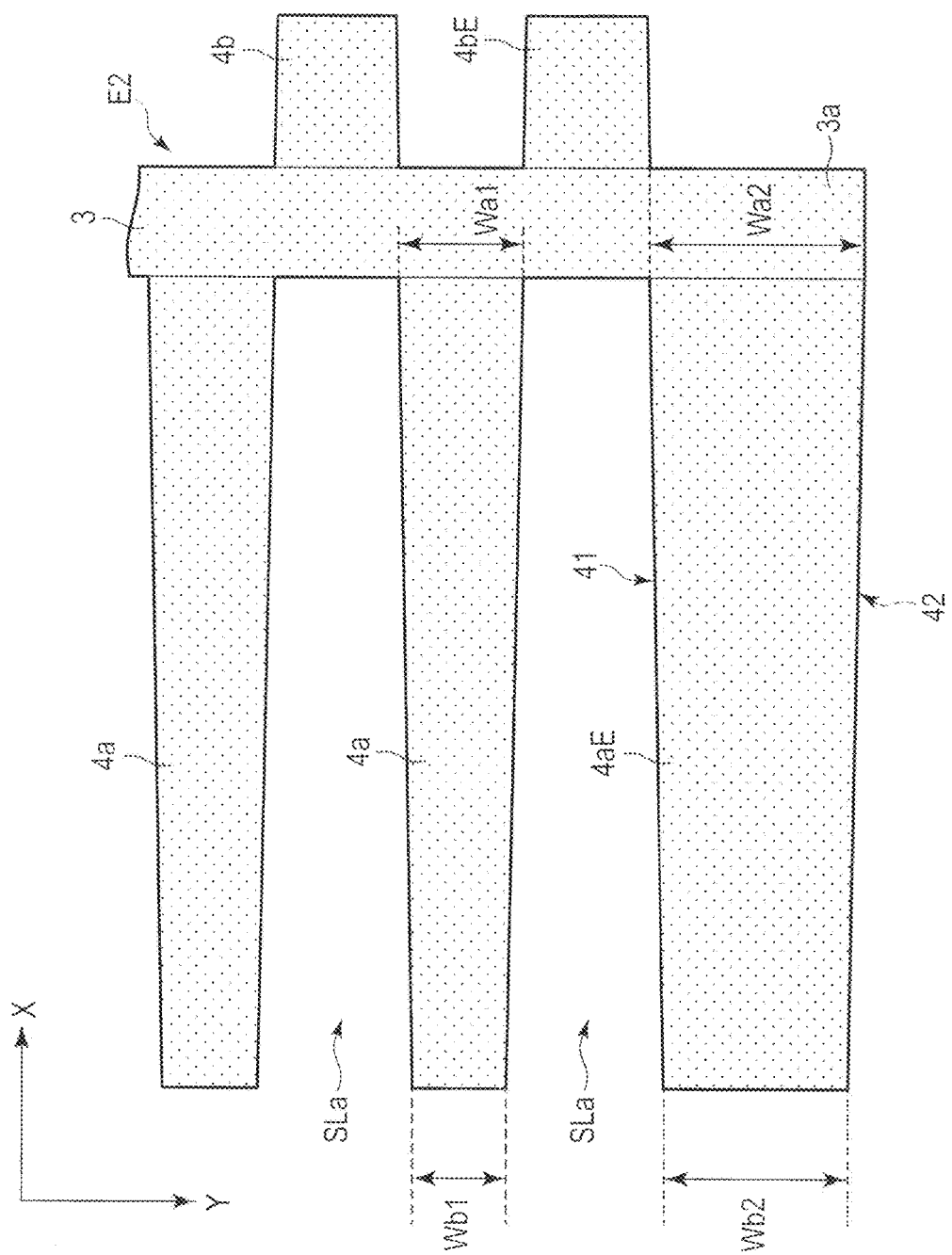
FIG. 18 schematically shows a part of the structure of a second electrode of a sixth embodiment.

FIG. 18 schematically shows a part of the second electrode E2 of the present embodiment. The second electrode E2 includes a connecting portion 3 and a plurality of comblike electrodes 4a and 4b as in the fifth embodiment. The connecting portion 3 has a projection 3a which projects in the second direction Y more than the outermost comblike electrode 4bE. In the example of FIG. 18, the end of the projection 3a in the second direction Y and the end of comblike electrode 4aE which is disposed outermost amongst comblike electrodes 4a are arranged basically on the same straight line.

Comblike electrodes 4a each have a width Wa1 in the second direction Y at their base ends and a width Wb1 in the second direction Y at their tips, except the outermost comblike electrode 4aE. Comblike electrode 4aE has a width Wa2 in the second direction Y at its base end wherein Wa2 is greater than Wa1 (Wa2>Wa1). Furthermore, comblike electrode 4aE has a width Wb2 in the second direction at its tip wherein Wb2 is greater than Wb1 (Wb2>Wb1).

Even if comblike electrode 4aE is formed wider than the other comblike electrodes 4a as above, disorder in the alignment of the liquid crystal molecules LM caused by the end area of the connecting portion 3 can be prevented as in the second embodiment.

Note that comblike electrodes 4b at the other side are in the same shape including the outermost comblike electrode 4bE, for example. However, comblike electrode 4bE may be formed wider than the other comblike electrodes 4b.

As to comblike electrodes 4b, the excellent alignment stability can be secured by the effect of the projection 3a of the connecting portion 3 as in the first embodiment.

Seventh Embodiment

Now, the seventh embodiment will be explained. This embodiment is a variation of the second embodiment and has the same structure except the shape of the second electrode E2.

Figure 19:
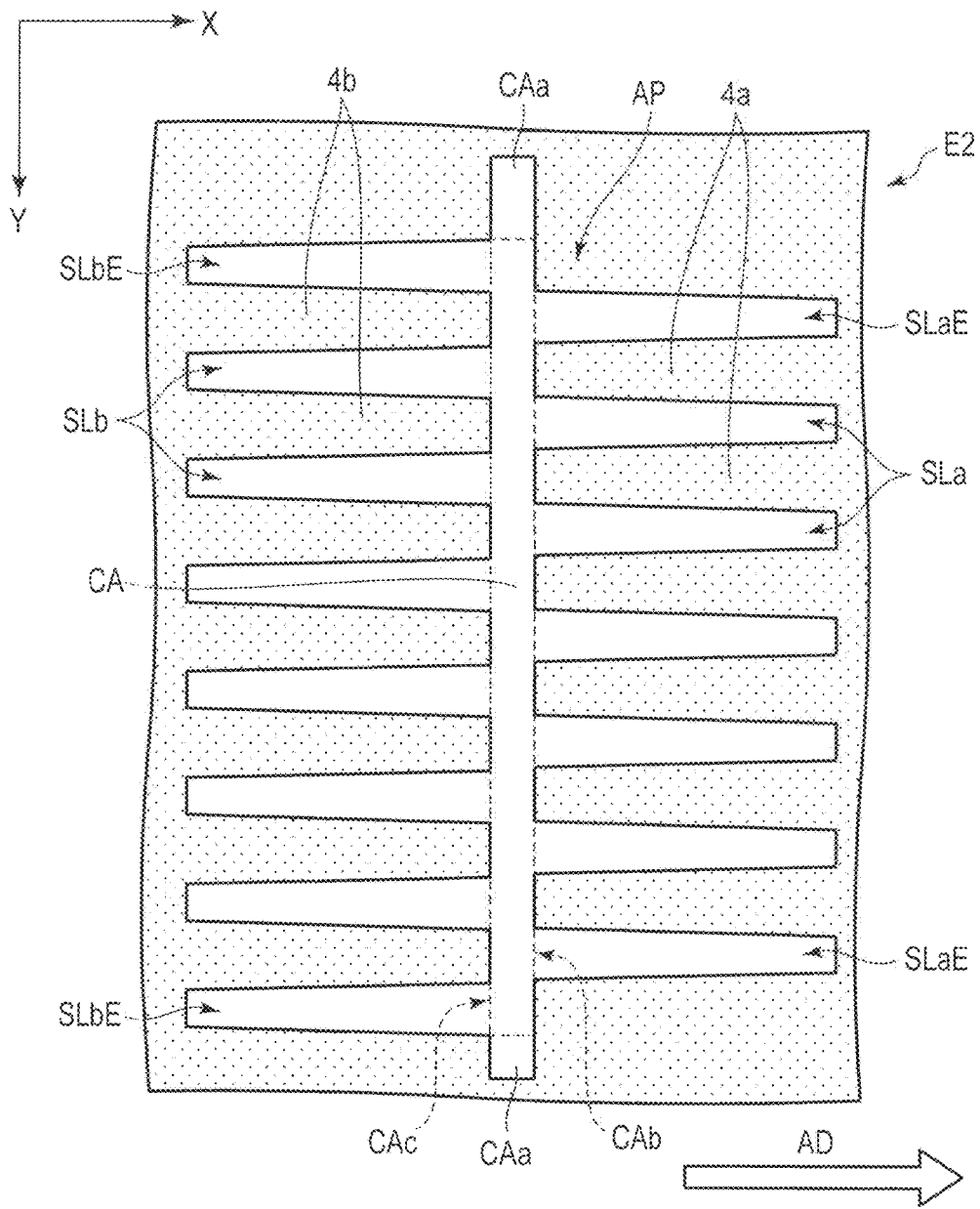
FIG. 19 schematically shows an example of a shape applicable to a second electrode of a seventh embodiment.

FIG. 19 shows an example of the shape of the second electrode E2 of the present embodiment. In this figure, the structure in the proximity of an aperture AP corresponding to a single subpixel SPX is depicted.

The second electrode E2 of the present embodiment is in a double-edged structure having comblike electrodes 4a and 4b extending in the center axis of the aperture AP. Comblike electrodes 4a and 4b extend parallel to the first direction X (alignment treatment direction AD) and are tapered toward their tips. Comblike electrodes 4a are arranged along the second direction Y with certain intervals. Furthermore, comblike electrodes 4b are arranged along the second direction Y with certain intervals. Slits SLa are defined by comblike electrodes 4a and slits SLb are defined by comblike electrodes 4b. Slits SLa and SLb extend parallel to the first direction X and are arranged along the second direction Y as comblike electrodes 4a and 4b. Slits SLa and SLb are connected together by a continuous aperture CA extending along the second direction Y.

From a different standpoint, the aperture AP includes a plurality of slits SLa extending from a first side CAb of the continuous aperture CA and a plurality of slits SLb extending from a second side CAc of the continuous aperture CA.

In the example of FIG. 19, comblike electrodes 4a and 4b are formed in the same shape, and an arrangement pitch of each of comblike electrodes 4a adjacent in the second direction Y and an arrangement pitch of each of comblike electrodes 4b adjacent in the second direction Y are the same. Comblike electrodes 4a and 4b are arranged alternately in the second direction Y.

Note that comblike electrodes 4a and 4b may be formed in different shapes with different arrangement pitches. Furthermore, comblike electrodes 4a and 4b may not be arranged alternately in the second direction Y but may be arranged on single straight lines parallel to each other in the first direction X.

In the example of FIG. 19, the second electrode E2 has the upper and lower outermost slits SLaE of slits SLa and the upper and lower outermost slits SLbE of slits SLb. Both the upper and lower outermost slits SLbE are arranged to be outside of the upper and lower outermost slits SLaE. The continuous aperture CA has two projections CAa at its ends and the projections CAa project in the second direction Y and the opposite direction, respectively, more than slits SLbE and SLaE.

Note that liquid crystal molecules LM behave in the proximity of comblike electrodes 4a and 4b as explained with reference to FIG. 17. Furthermore, as in the example of FIG. 19, in the structure where comblike electrodes 4a and 4b are arranged alternately in the second direction Y, the liquid crystal molecules LM in the proximity of comblike electrodes 4a and 4b of which sides are arranged basically on the straight line in the first direction X rotate in the same direction, and the response speed can be increased more.

In the second electrode E2 structured as above, the alignment of the liquid crystal molecules LM in the proximity of slits SLaE and SLbE may be disordered by the effect of the end areas of the continuous aperture CA. However, the continuous aperture CA of the present embodiment has projections CAa which can reduce the effect of the end areas of the continuous aperture CA upon the liquid crystal molecules LM in the proximity of slits SLaE and SLbE as in the second embodiment. Thus, the alignment stability can be improved.

Eighth Embodiment

Now, the eighth embodiment will be explained.

The present embodiment provides another method of reducing alignment disorder in the double-edged second electrode E2 of the seventh embodiment. Unless otherwise specified, the present embodiment has the same structure as the seventh embodiment.

Figure 20:
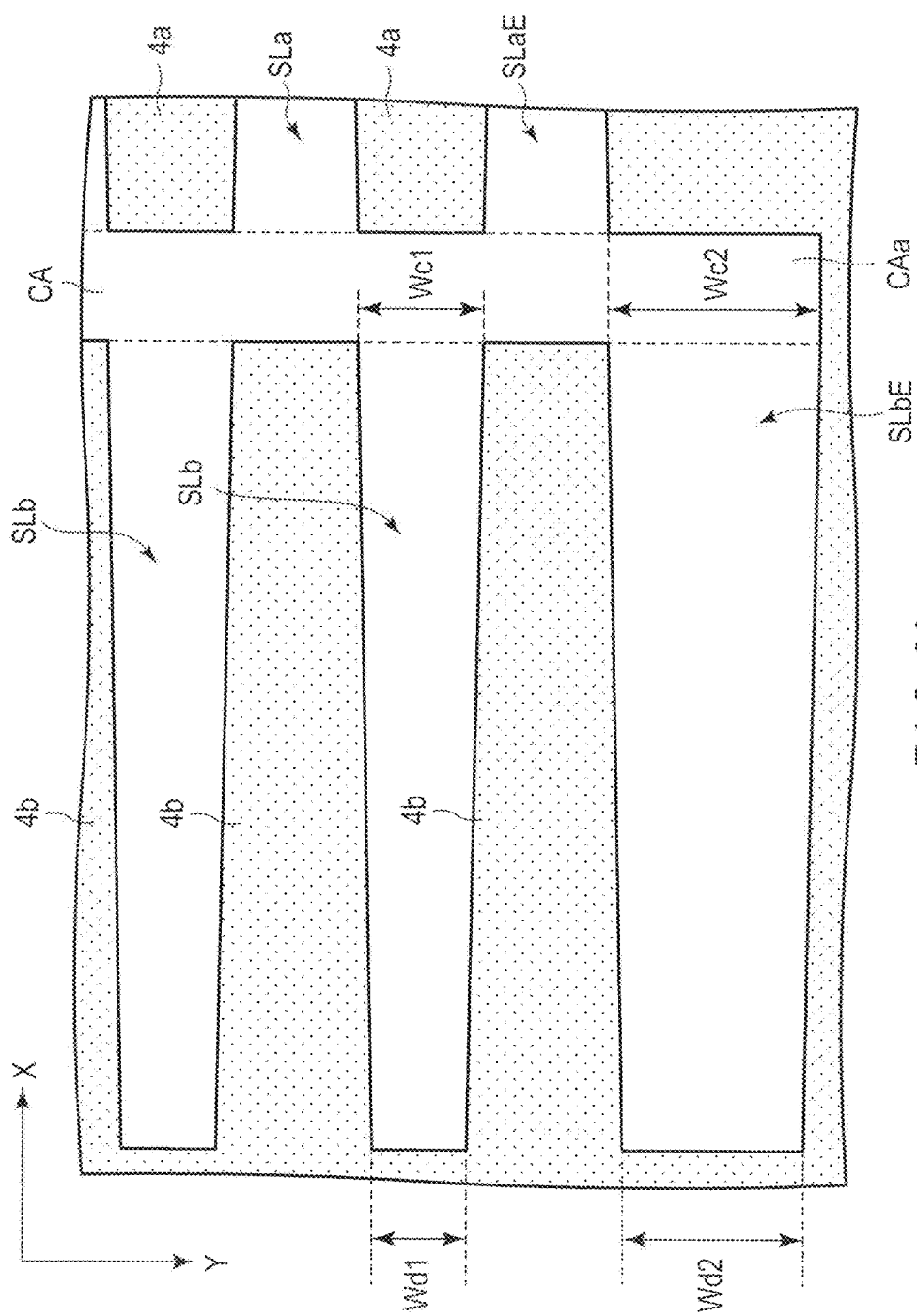
FIG. 20 schematically shows a part of a second electrode of an eighth embodiment.

FIG. 20 schematically shows a part of the second electrode E2 of the present embodiment. The second electrode E2 includes a continuous aperture CA and a plurality of comblike electrodes 4a and 4b as in the seventh embodiment. Slits SLa extending parallel to the first direction X are defined by comblike electrodes 4a, slits SLb extending parallel to the first direction X are defined by comblike electrodes 4b, and the ends of the slits SL are connected together by the continuous aperture CA extending in the second direction Y.

The continuous aperture CA has a projection CAa which projects in the second direction Y more than the outermost slit SLaE. In the example of FIG. 20, the end of the projection CAa in the second direction Y and the end of slit SLbE which is disposed outermost in the second direction Y amongst slits SLb are arranged basically on the same straight line.

Slits SLb each have a width Wc1 in the second direction Y at their base ends (joint positions with the continuous aperture CA) and a width Wd1 in the second direction Y at their tips, except slit SLbE disposed at the outermost end in the second direction Y. Slit SLbE has a width Wc2 in the second direction Y at its base end wherein Wc2 is greater than Wc1 (Wc2>Wc1). Furthermore, slit SLbE has a width Wd2 in the second direction at its tip wherein Wd2 is greater than Wd1 (Wd2>Wd1). That is, slit SLbE of the example of FIG. 20 is wider in its entirety than the other slits SLb.

Even if slit SLbE is formed wider than the other slits SLb as above, disorder in the alignment of the liquid crystal molecules LM caused by the end area of the continuous aperture CA can be prevented as in the fourth embodiment.

Note that slits SLa at the other side are in the same shape including the outermost slit SLaE, for example. However, slit SLaE may be formed wider than the other slits SLa.

As to slits SLa, the excellent alignment stability can be secured by the effect of the projection CAa as in the third embodiment.

Note that, although FIG. 20 shows only one end of the continuous aperture CA, the same advantage can be obtained at the other end.

(Variations)

The structures of the first to eighth embodiments can be modified suitably.

For example, in the structures of the first and the second embodiments, liquid crystal molecules of the liquid crystal layer LQ possess positive dielectric anisotropy. However, liquid crystal molecules possessing negative dielectric anisotropy can be used for the liquid crystal layer LQ of these embodiments. In that case, the alignment treatment direction AD (or the initial alignment direction of liquid crystal molecules) will be set to a direction orthogonal to the extending direction of the comblike electrodes 4 and slits SL (that is, the second direction Y).

Several embodiments of the present application have been presented above; however, they are examples of the present application and no limitation to the scope of invention is intended thereby. The novel embodiments described above can be achieved in other various models, and as long as they stay within the scope of the invention, can be achieved with various omission, replacement, and modification to their details. The embodiments and variations are encompassed by the scope and concept of the invention and included within the range equal to the inventions recited in the claims.

What is claimed is:

1. A display device comprising:
a first substrate including a first electrode, an insulating layer covering the first electrode, a second electrode opposed to the first electrode with the insulating layer interposed therebetween, and a first alignment film covering the second electrode;
a second substrate including a second alignment film opposed to the first alignment film; and
a liquid crystal layer including liquid crystal molecules sealed between the first alignment film and the second alignment film, wherein
an initial alignment direction of the liquid crystal molecules is parallel to a first direction or a direction which is orthogonal to the first direction,
the second electrode comprises a connecting portion extending in a second direction which crosses the first direction, a plurality of first comblike electrodes extending from a first side of the connecting portion parallel to the first direction and arranged along the second direction, and a plurality of second comblike electrodes extending from a second side of the connecting portion parallel to the first direction and arranged along the second direction, the first comblike electrodes and the second comblike electrodes arranged alternately along the second direction, and
the connecting portion includes a projection which projects in the second direction more than an outermost first comblike electrode of the first comblike electrodes while an outermost second comblike electrode of the second comblike electrodes at a side of the projection is wider in the second direction than the other second comblike electrodes.

2. The display device of claim 1, wherein the outermost second comblike electrode at the side of the projection extends from the projection.

* * * * *